(12) United States Patent
Van Veldhuisen

(10) Patent No.: US 9,668,007 B2
(45) Date of Patent: *May 30, 2017

(54) ADAPTIVE STREAMING TRANSCODER SYNCHRONIZATION

(71) Applicant: ARRIS Enterprises LLC, Suwanee, GA (US)

(72) Inventor: Brenda Van Veldhuisen, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,542

(22) Filed: Jul. 6, 2016

(65) Prior Publication Data

US 2016/0316235 A1    Oct. 27, 2016

Related U.S. Application Data

(63) Continuation of application No. 14/581,108, filed on Dec. 23, 2014, now Pat. No. 9,414,100.
(Continued)

(51) Int. Cl.
H04N 7/173    (2011.01)
H04N 7/01    (2006.01)
(Continued)

(52) U.S. Cl.
CPC ......... *H04N 21/242* (2013.01); *H04N 21/231* (2013.01); *H04N 21/233* (2013.01);
(Continued)

(58) Field of Classification Search
None
See application file for complete search history.

(56) References Cited

U.S. PATENT DOCUMENTS 5,757,435 A   5/1998   Wells
6,118,488 A   9/2000   Huang
(Continued)

FOREIGN PATENT DOCUMENTS

EP   1004195 A1   5/2000
EP   2605523 A1   6/2013
(Continued)

OTHER PUBLICATIONS

PCT Search Report & Written Opinion, RE: Application No. PCT/US2015/022585; dated Jun. 2, 2015.
(Continued)

*Primary Examiner* — William J Kim
(74) *Attorney, Agent, or Firm* — Lori Anne D. Swanson

(57) ABSTRACT

Techniques for synchronizing streams in an adaptive streaming environment include cross-chassis and intra-chassis synchronization of video and/or audio. In an adaptive streaming system that streams content in segments or chunks at varying levels of quality corresponding to different coding rates, implementations enable seamless switching between output streams. For example, synchronizing multiple output streams for switching between coded adaptive bit rate streams across multiple chassis involve enforcing decisions of a master encoder for inverse telecine, frame rate conversion, and segment boundary to slave encoders associated with the same group of output stream representations.

19 Claims, 15 Drawing Sheets

Related U.S. Application Data

(60) Provisional application No. 62/020,118, filed on Jul. 2, 2014, provisional application No. 61/972,647, filed on Mar. 31, 2014, provisional application No. 62/020,134, filed on Jul. 2, 2014.

(51) Int. Cl.
| | |
|---|---|
| *H04N 11/20* | (2006.01) |
| *H04N 21/242* | (2011.01) |
| *H04N 21/2368* | (2011.01) |
| *H04N 21/231* | (2011.01) |
| *H04N 21/233* | (2011.01) |
| *H04N 21/2343* | (2011.01) |
| *H04N 21/236* | (2011.01) |
| *H04N 21/643* | (2011.01) |
| *H04N 21/2365* | (2011.01) |
| *H04N 21/8547* | (2011.01) |
| *H04N 21/845* | (2011.01) |
| *H04N 21/234* | (2011.01) |
| *H04N 21/647* | (2011.01) |
| *H04N 19/68* | (2014.01) |
| *H04N 5/067* | (2006.01) |

(52) U.S. Cl.
CPC ..... *H04N 21/2335* (2013.01); *H04N 21/2368* (2013.01); *H04N 21/23418* (2013.01); *H04N 21/23439* (2013.01); *H04N 21/23602* (2013.01); *H04N 21/23605* (2013.01); *H04N 21/23655* (2013.01); *H04N 21/234309* (2013.01); *H04N 21/234381* (2013.01); *H04N 21/647* (2013.01); *H04N 21/64322* (2013.01); *H04N 21/845* (2013.01); *H04N 21/8456* (2013.01); *H04N 21/8547* (2013.01); *H04N 5/067* (2013.01); *H04N 19/68* (2014.11)

(56) References Cited

U.S. PATENT DOCUMENTS

| | | |
|---|---|---|
| 6,370,198 B1 | 4/2002 | Washino |
| 7,877,468 B2 | 1/2011 | Abadir et al. |
| 8,325,821 B1 | 12/2012 | Kizhepat et al. |
| 8,629,913 B2 | 1/2014 | Cote et al. |
| 8,644,678 B2 | 2/2014 | Smith et al. |
| 8,676,036 B1 | 3/2014 | Bhogal et al. |
| 8,843,977 B2 | 9/2014 | Ruffini et al. |
| 8,880,043 B1 | 11/2014 | Albinson et al. |
| 2004/0010492 A1 | 1/2004 | Zhao et al. |
| 2005/0080497 A1 | 4/2005 | Rao |
| 2006/0031889 A1 | 2/2006 | Bennett |
| 2006/0083434 A1 | 4/2006 | Inata et al. |
| 2007/0061522 A1 | 3/2007 | Vink |
| 2007/0074266 A1 | 3/2007 | Raveendran et al. |
| 2007/0157260 A1 | 7/2007 | Walker |
| 2007/0206741 A1 | 9/2007 | Tiliks et al. |
| 2008/0064490 A1 | 3/2008 | Ellis |
| 2008/0115171 A1 | 5/2008 | Barsness et al. |
| 2008/0133716 A1 | 6/2008 | Rao et al. |
| 2008/0235733 A1 | 9/2008 | Heie et al. |
| 2008/0249987 A1 | 10/2008 | Ogasawara |
| 2009/0172742 A1 | 7/2009 | Weaver |
| 2009/0177526 A1 | 7/2009 | Aaltonen et al. |
| 2009/0254672 A1 | 10/2009 | Zhang |
| 2009/0254675 A1 | 10/2009 | Harrang et al. |
| 2010/0091188 A1 | 4/2010 | Maiti et al. |
| 2010/0091888 A1 | 4/2010 | Nemiroff |
| 2010/0231754 A1 | 9/2010 | Wang et al. |
| 2010/0277606 A1 | 11/2010 | Deluca et al. |
| 2011/0038613 A1 | 2/2011 | Buchheit |
| 2011/0299448 A1 | 12/2011 | Meier et al. |
| 2012/0002111 A1 | 1/2012 | Sandoval et al. |
| 2012/0117103 A1 | 5/2012 | Farrelly et al. |
| 2012/0117339 A1 | 5/2012 | Kandekar et al. |
| 2012/0210382 A1 | 8/2012 | Walker et al. |
| 2012/0224834 A1 | 9/2012 | Chen et al. |
| 2012/0268901 A1 | 10/2012 | Jeschko |
| 2013/0014187 A1 | 1/2013 | Huang et al. |
| 2013/0044803 A1 | 2/2013 | Fisher et al. |
| 2013/0054479 A1 | 2/2013 | Ross et al. |
| 2013/0080457 A1 | 3/2013 | Narayanan et al. |
| 2013/0129322 A1 | 5/2013 | Bhogal et al. |
| 2013/0133009 A1 | 5/2013 | Bhogal et al. |
| 2013/0136427 A1 | 5/2013 | Washino |
| 2013/0174202 A1 | 7/2013 | Kim et al. |
| 2013/0226820 A1 | 8/2013 | Sedota, Jr. et al. |
| 2013/0272374 A1 | 10/2013 | Eswaran et al. |
| 2014/0013342 A1 | 1/2014 | Swan et al. |
| 2014/0019542 A1 | 1/2014 | Rao et al. |
| 2014/0067898 A1 | 3/2014 | Steiner et al. |
| 2014/0282787 A1 | 9/2014 | Wirick et al. |
| 2015/0135247 A1 | 5/2015 | Kitazato |
| 2015/0143416 A1 | 5/2015 | Onno et al. |
| 2015/0281746 A1 | 10/2015 | Lam |

FOREIGN PATENT DOCUMENTS

| | | |
|---|---|---|
| JP | 2009188690 A | 8/2009 |
| WO | 2012112910 A1 | 8/2012 |
| WO | 2013014864 A1 | 1/2013 |

OTHER PUBLICATIONS

"Open Cable Specification Adaptive Transport Stream Specification", Cable Television Laboratories, Inc., Document OC-SP-ATS-I01-140214, Feb. 14, 2014.

Wikipedia, description of Predictive Analytics, URL: <http://en.wikipedia.org/wiki/Predictive_analytics>, Jan. 17, 2013.

PCT Search Report & Written Opinion, RE: Application No. PCT/US2014/026883, dated Aug. 13, 2014.

PCT Search Report & Written Opinion, RE: Application No. PCT/US2014/021640, dated Jul. 4, 2014.

J. Baumgartner, "Comcast Tests Network DVR in Boston", Light Reading, retrieved from the Internet at <http://www.lightreading.com/document.asp?doc_id=219785&site=lr_cable>, Apr. 13, 2012.

S. Donohue, "Comcast Unveils Blueprint for Network DVR in Patent Application", Fierce Cable, retrieved from the Internet at <http://www.fiercecable.com/story/comcast-unveils-blueprint-network-dvr-patent-application/2012-08-29>, Aug. 29, 2012.

Examination Report, RE: Great Britain Application No. GB1521950.4, dated Jan. 18, 2016.

ADAPTIVE STREAMING TRANSCODER SYNCHRONIZATION

CROSS REFERENCE TO RELATED APPLICATION

This Application is a Continuation claiming claims priority under 35 U.S.C. §119(e) from earlier filed U.S. patent application Ser. No. 14/581,108 filed on Dec. 23, 2014; U.S. Provisional Application Ser. No. 61/972,647 filed on Mar. 31, 2014; U.S. Provisional Application Ser. No. 62/020,118 filed on Jul. 2, 2014; and U.S. Provisional Application Ser. No. 62/020,134 filed on Jul. 2, 2014, and incorporated herein by reference in its entirety.

BACKGROUND

An internet protocol video delivery network based on adaptive streaming techniques can provide many advantages over traditional cable delivery systems, such as greater flexibility, reliability, lower integration costs, new services, and new features. Currently available streaming media systems may rely on multi bit rate (MBR) coding to perform client ingest rate control. In MBR coding, source content is encoded into alternative bit streams at different coding rates and typically stored in the same media file at the server. The content may be streamed in segments, fragments, or chunks at varying levels of quality corresponding to different coding rates, often switching bit streams between segments as a result of changing network condition. Currently, there are limited or ineffective techniques for synchronizing multiple coded adaptive bit rate output streams across multiple chassis or multiple transcoders that house multiple transcoding processors.

Thus, techniques for synchronizing output streams having varying bitrates, resolutions, and/or frame rates are desirable. In particular, inter-chassis or intra-chassis synchronization techniques for syncing a plurality of output streams are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DETAILED DESCRIPTION

Disclosed herein are techniques for synchronizing streams in an adaptive streaming environment, including techniques for cross-chassis and intra-chassis synchronization of video and/or audio. Embodiments are described for achieving synchronization of a plurality of adaptive streaming transcoder outputs using the one or more of the techniques for synchronization. Disclosed are details for implementing the foregoing techniques in an adaptive streaming system that streams content in segments or chunks at varying levels of quality corresponding to different coding rates. As described in more detail below, implementations of the disclosed techniques may enable seamless switching between output streams. For example, embodiments are disclosed for synchronizing multiple output streams for switching between coded adaptive bit rate streams across multiple chassis. Embodiments are disclosed that improve the functionality of a high density transcoder while maintaining or enhancing video quality.

Figure 1:
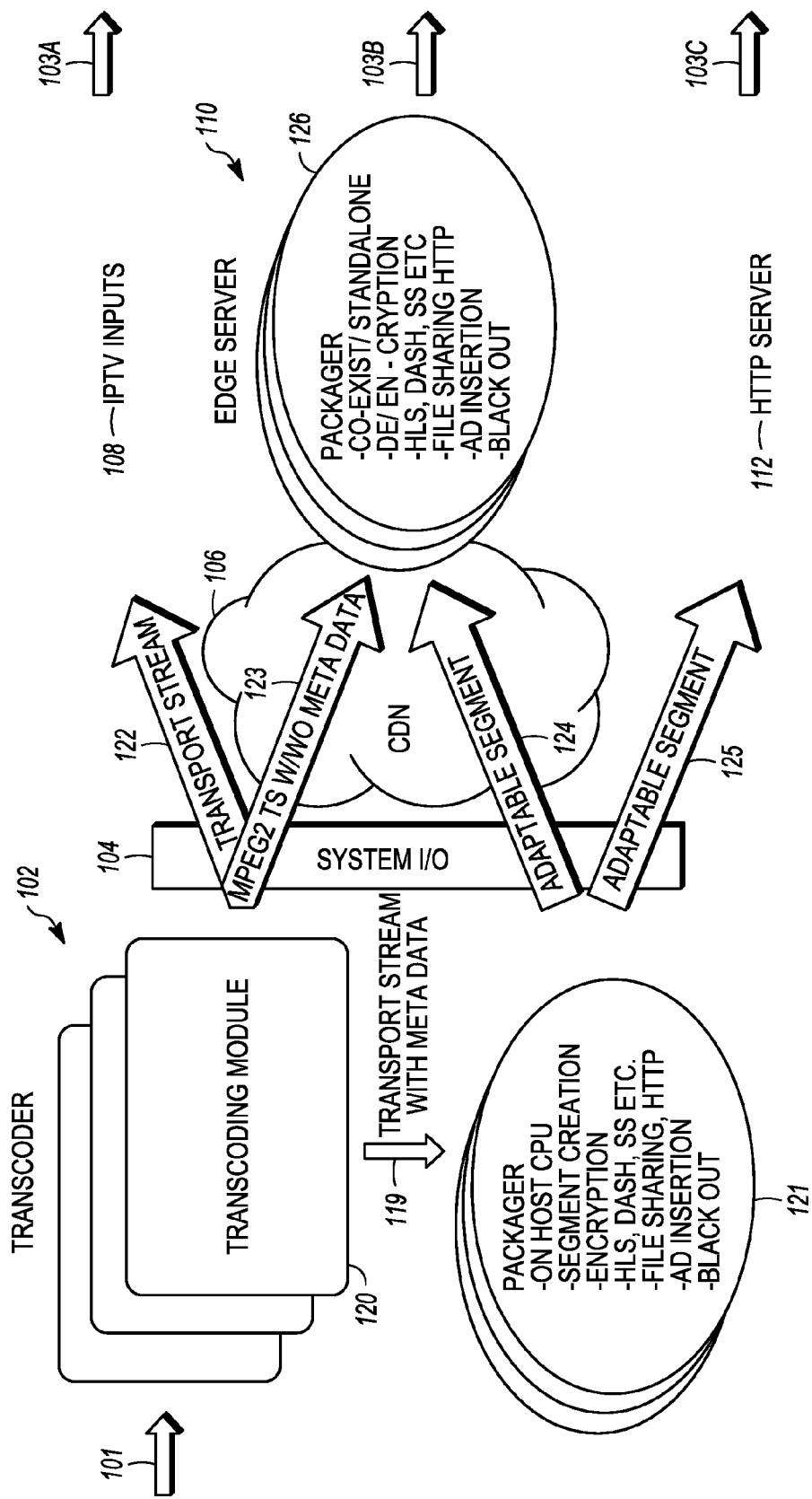
FIG. 1 depicts a high level architecture of an example adaptive streaming system including a transcoder.
Figure 2:
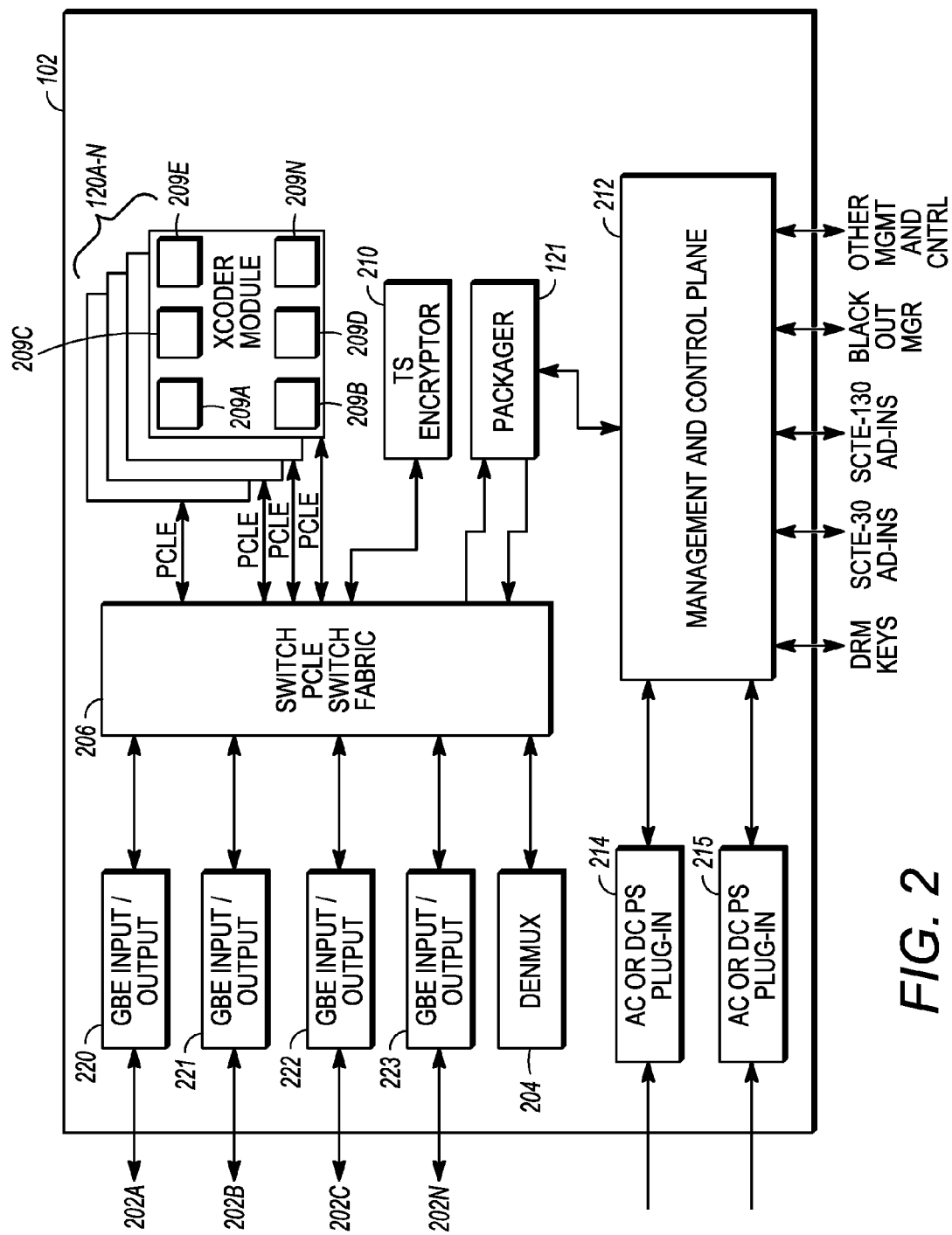
FIG. 2 depicts a closer view a transcoding module.
Figure 3:
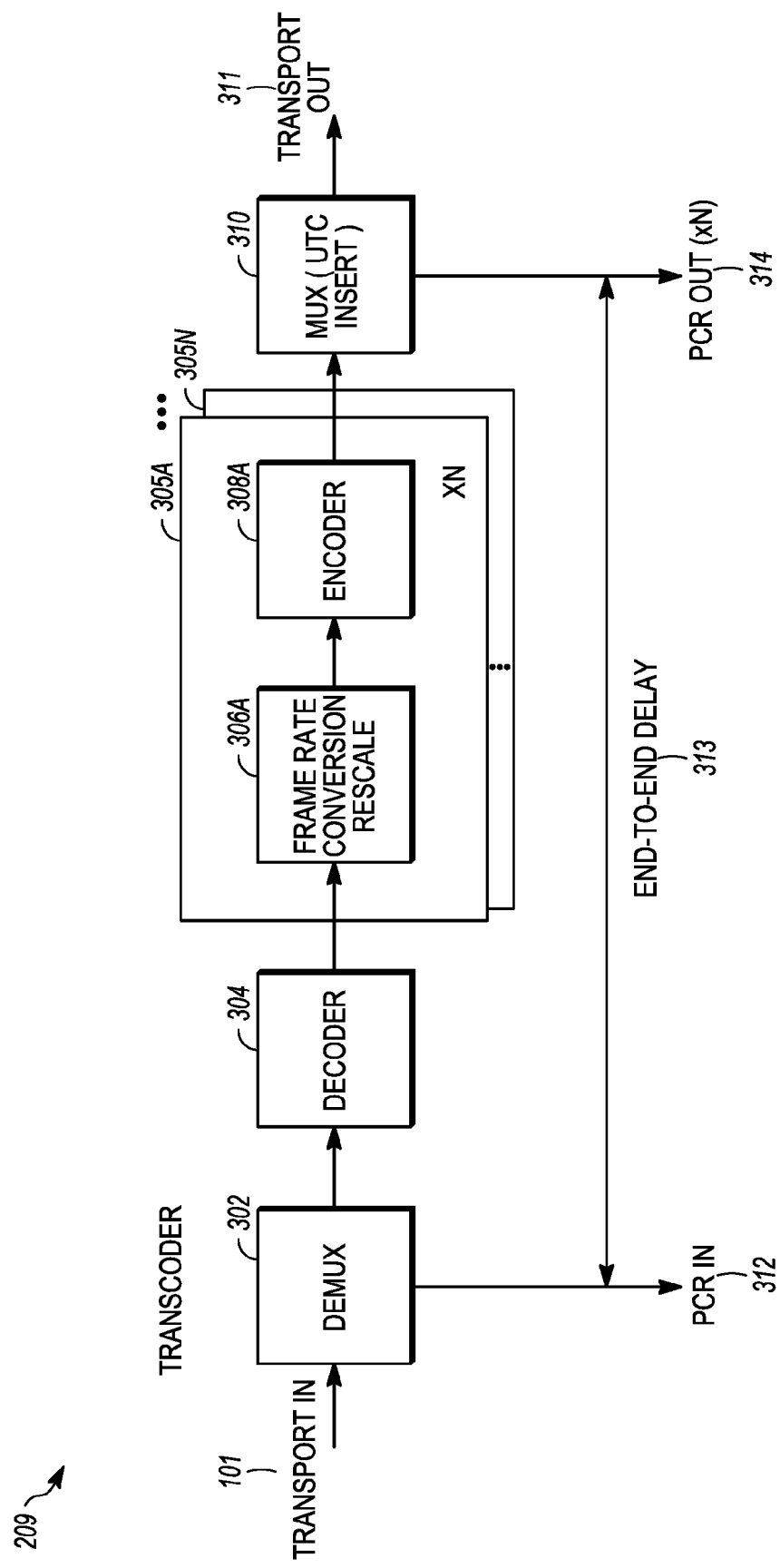
FIG. 3 illustrates the details of an example processor or chip on transcoding module card.

FIG. 1 depicts a high level architecture of an example adaptive streaming system including a transcoder 102 according to the disclosed techniques. FIG. 2 depicts a closer examination at the details of a transcoding module, and FIG. 3 illustrates the details of an example processor or chip on transcoding module card.

Adaptive bitrate streaming is a technique used in streaming multimedia over computer networks. Shown in the adaptive streaming system in FIG. 1 are the transcoder 102, a system I/O 104, a content delivery network 106, IPTV inputs 108, an edge server 110, and an HTTP server 112. The system I/O may be any program, operation, or device that transfers data to or from the transcoder to or from a peripheral device. For example, the input may be a port that receives MPEG-2 transport streams carried over Ethernet. In another example, the transport stream is received at the input from a Bayonet Neill-Concelman (BNC) cable via an ASI) card. The components shown in FIG. 1 are part of a content distribution system and may be located at a headend for distributing content in a cable television (CATV) or internet protocol television (IPTV) network.

Compression processes may more efficiently transmit or store otherwise uncompressed video data. An example of a compression technique is MPEG-4 Part 10 compression (referred to herein as MPEG-4). The MPEG-4 standard is the same as the H.264 standard. These standards are maintained by the ITU and MPEG standards organizations and include both field and frame coding.

Transcoding is a process by which an encoded video stream is converted to another compression format, or the characteristics of the current format are changed. A transcoding module in the transcoder 120 can perform multi-rate, multi-resolution conversions on the input stream 101 to produce one or more multi-bit rate streams. The transcoder may provide multi-bit rate streams in a variety of formats, such as MPEG-2, MPEG-2: H.264, MPEG-4 AVC, SPTS, GOP/IDR aligned, UDP/IP, multicast or unicast, and/or with or without encryption.

As shown in FIG. 1, the transcoder 102 receives a source stream 101, such as a source video or audio bitstream. The source stream 101 may enter the transcoder 102 via an interface and source frames from the input stream 101 may be stored or located in a memory. The output from the transcoder may be output via a system I/O 104 at streams 1122, 123 to an IPTV network or to an edge server 110 for distribution to a subscriber device. A stream may be a transport stream 122, such as a broadcast MPEG-2 transport stream that inputs to an IPTV without going through a packager, sent directly to an IPTV input 108, e.g., an input to a set-top box. The stream may be a transport stream with or without metadata 123 that is sent to a content delivery network 106 for delivery to an edge server. The CDN may guarantee IP delivery to the edge server. Thus, embodiments depicted in FIG. 1 include a delivery of streams to IPTV inputs 108 or to an edge server 110 via a content delivery network 106.

A content delivery network or content distribution network (CDN) 106 as used herein refers to a distributed system of servers deployed in multiple data centers around the Internet, which is a global system of interconnected computer networks that use a standard protocol to link several billion devices worldwide. Examples of a content delivery network 106 include networks comprising, for example, managed origin and edge servers or edge cache/streaming servers. The content delivery servers, such as edge cache/streaming server, deliver content and manifest files (e.g., via one or more wired and/or wireless telecommunication networks, not pictured) to IP subscribers.

In an illustrative example, content delivery network 106 comprises an access network that includes communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links of content delivery network 106 can include, for example, a transmission medium such as an optical fiber, a coaxial cable, or other suitable transmission media or wireless telecommunications. In an exemplary embodiment, content delivery network 106 comprises a hybrid fiber coaxial (HFC) network.

The CDN 106 typically includes a set of core servers and a set of edge servers. Core servers manage the CDN, saving the content being distributed and when needed forwarding content to edge servers to serve requesting clients. The CDN may provide improved user performance in terms of delay and throughput by deploying multiple nodes, usually called edge servers, distributed geographically in multiple Internet Service Providers.

An edge server in the adaptive streaming network, such as edge server 110, may refer to a server that resides on the edge between two networks, typically a private network and the Internet. Edge servers can serve different purposes depending on the context of the functionality in question. The CDN may receive media content and replicate it to many or all of its Edge cache servers. The end-user requests the stream and is redirected to the "closest" Edge server. The use of HTTP-based adaptive streaming allows the Edge server to manage an HTTP server and packager 126. Each edge server may implement a streaming server, and when a user requests a video stream, the user may be redirected to the closest edge server to start the desired stream.

In embodiments, the transcoder 102 outputs a transcoded output stream 119 to a packager 121. The packager 121 may be a software module that resides on the same platform as the transcoder or as a standalone entity on a different server platform. As shown in FIG. 1, the packager 121 is shown internal to the transcoder 102, but it should be recognized that the packager 121 may be externally located and otherwise communicatively coupled to the transcoder.

As disclosed herein, part of the transcoding process by the disclosed transcoding module 120 includes marking the boundary of a media segment per configuration and passing it as embedded private metadata in an output stream 119, e.g., an MPEG 2 transport stream, to the packager 121. As described in more detail below, the signaling between the transcoder and the packager identifying segment boundaries may be instantaneous decode refresh (IDR) based signaling. The packager 121, also referred to as a segmenter, a fragmenter, or an encapsulator, receives the transcoded video output from the transcoder and packages the video based on a delivery protocol, such as a proprietary deliver protocol, e.g., Microsoft Smooth Streaming, Apple HTTP Live Streaming (HLS). The packager ingests live streams or files, depending on whether the media content is live or on-demand. The packager segments each stream received in to chunks according to a delivery protocol and based on the segment boundaries identified during transcoding. The packager may encrypt segments on a per delivery protocol basis as they are packaged, and may enable content rights on a session basis.

The packager 121 creates adaptive manifest files and media segments per adaptive container format, such as HLS, HDS, IIS-SS or MPEG DASH etc. Following segmentation of the transport stream 119, the packager 121 sends the media segments 124, 125 to the content delivery network 106 or external HTTP server 112 via HTTP or a file sharing protocol for content distribution. The interface between the packager 121 and the CDN may be HTTP push or HTTP pull. Additional details for generating adaptive manifest files and publishing media segments to an HTTP server, along with retrieving media segments by the client device, are described in more detail below with respect to FIGS. 14 and 15.

FIG. 2 depicts a high level functional block diagram of an example adaptive streaming transcoder 102 that may receive and/or transmit a plurality of media content. The transcoder 102 may include one or more transcoding modules 120*a-n* for performing transcoding. The transcoding modules 120*a-n* may transcode a stream to change the encoded bit rate, video frame size, frame rate, or other format parameters. In embodiments, the transcoding process includes the conversion of a stream from one encoding type to another, for example to convert H.264 video to Windows Media Video (WMV). In embodiments, the transcoder module 120 may transmit the transcoded media content in the same format as the received media content. For example, the transcoder module 120 may receive media content of MPEG-2 Transport Streams over UDP/IP with or without RTP, and transmit the transcoded media in the same format.

As shown in FIG. 2, the transcoder 102 may be a high density transcoder that supports four gigabit Ethernet (GbE or 1 GigE) interfaces configured to receive or transmit program transport streams. The Ethernet interfaces are shown by way of example for interfaces for inputting/outputting media content. For example, also contemplated are inputs transport over ASI from a fiber or coaxial cable. Thus, it should be understood that references to GigE interfaces in implementations described herein are by way of example.

The GigE interfaces 220, 221, 222, 223 may be configured for receiving and/or transmitting transport streams via a communication path. For example, a GbE Input 220, 221, 222, 223 may be configured for receiving MPEG-2 or MPEG-4 transport streams over UDP/IP using IP multicast or unicast. The GbE interfaces may be configured such that each GbE port is used for input only, output only, or both input and output as a default. Each GbE port may be enabled or disabled for management interface. At least one pair of GbE ports may be in a pair bonding mode that can be used for input only, output only, or both input and output. Both input and output streams can be either IP multicast or IP unicast to or from each of the GbE ports.

The inputs to the GbE inputs 220, 221, 222, and 223 are passed to a switch 206. The switch may be any switch suitable for connecting the transcoder's inputs with the transcoder modules 120*a-n*. In embodiments, the switch 206 is an expansion bus in accordance with Peripheral Component Interconnect Express (PCIe), which is a high-speed serial computer expansion bus standard. A PCIe switch 206 may offer a serial connection that operates more like a network than a bus. For example, instead of one bus that handles data from multiple sources, a PCIe switch may control several point-to-point serial connections. The connections from the PCIe switch fan out, leading directly to the devices where the data are destined. Every device has its own dedicated connection, so devices do not have to share bandwidth like they do on a normal bus. A PCIe switch determines which devices are plugged into the motherboard, identifies the links between the devices, and creates a map of where traffic will go, negotiating the width of each link.

The output of the switch 206 is to one or more of the plurality of transcoder modules 120*a-n*, which may each include one or more transcoding processors 209*a-n*. A transcoding processor 209*a-n* may be a magnum chip, such as the Magnum D7Pro Processor. The transcoding processor 209*a-n* is also referred to as a transcoder/encoder system on a chip (SOC). The transcoding processors 209*a-n* in each of the transcoder modules 208*a-n* may perform the transcoding. As will be described in more detail below with respect to FIG. 3, each transcoding processor 209*a-n* has at least one decoder and at least one encoder for performing the transcoding process of decoding and re-encoding.

In an example hardware configuration, a chassis design is a high-density platform that combines headend, hub, and digital transport into a single rack unit (RU) scalable system, allowing service providers to deploy advanced services such as video on demand (VOD), high speed data, and telephony. The chassis may include module slots in a rack unit footprint. In an example, the chassis accommodates up to 4 plug-in hardware transcoder modules (boards), shown as XCODER modules 120*a-n* in FIG. 2.

The transcoder modules 120*a-n* are example transcode boards which provide input to multi-rate output transcoding. An XCODER board 120*a-n* can host six DSP chips and support at least three HD input transcoder service channels. The number of boards installed is dictated by the maximum number of transcoder service channel required by the transcoder. The XCODER boards are hot-swappable from front. Their locations are typically labeled in the chassis as slot A, B, C, and D from top left to top right, and then bottom left to bottom right when facing the front panel.

In the example hardware configuration described below, the transcoder 102 is assumed to include four transcoding module 120*a*-120*d*, similar to the design of a typical XCODER board, and each transcoding module includes six transcoding processors 209*a-f*. However, it should be understood that the techniques disclosed herein are scalable for functioning on any number of inputs/outputs capable by the transcoder 102. Increasing the capabilities of the transcoder 102 may require modifications to the hardware, such as increasing power and/or adding other components, such as increasing the number of pre-processors or decoders. In embodiments, the transcoder 102 transcodes each input 101 to a required output profile or output stream representations. Multiple profiles, or stream representations, may be output from a single input stream 101, each profile/stream representation having its own resolution and bit rate parameters. Resolutions may be scaled to be suitable for respective client devices. The quality of experience for a client may depend on having a number of different profiles, so it may be desirable to encode a plurality of output profiles for each input. Each transcoding processor 209*a-n* (also referred to herein as a transcoding chip or transcoding processing chips) can receive an input and transcode the input to multiple outputs. The number of transcodes possible by the transcoding processing chip may depend on the resolution. Each transcoding processor 209*a-n* can receive a different stream. Each transcoding processor 209*a-n* can receive multiple streams (e.g., each ½ chip can transcode a different input). Further, multiple transcoding processor 209*a-n* can receive the same stream if one output group has too many profiles for only one chip to handle.

Assume as shown in the example in FIG. 2 that each transcoding module 120*a-n* includes six transcoding processing chips 209*a-f* and each transcoding processor 209*a-f* is capable of transcoding an input 101 in to eight multiple bit rate streams. Thus, each transcoding module 209*a-f* can receive six inputs (one at each of the six transcoding processors 209*a-f*) and output 48 stream representations, or stated another way, output 6 streams transcoded to eight profiles from each transcoding processor 209*a-f* for a total output of 48 profiles from each transcoding module 209*a-f*. For a transcoder 102 with four transcoding module boards 120*a*-120*d*, as illustrated in FIG. 2, that output 48 profiles each, the transcoder 102 can therefore output 196 profiles (4 transcoding modules×48 profiles). So the maximum profiles in this example is 4 boards×6 processors×8 profiles=192. Thus, the transcoder is capable of transcoding 48 inputs to 192 profiles, i.e., 48 output streams transcoded to 192 profiles.

It should be understood that the number of transcodes and multiple bit rate stream outputs described herein are examples provided for purposes of discussion, but varying hardware configurations and capabilities are contemplated. For example, the number of transcodes may be different based on varying the number of transcoding processors on a transcoding chip, varying the number of transcoding modules in a transcoding unit, varying the number of outputs a transcoding processor can output, or the like, e.g., other hardware configurations.

The 6 chips and 4 modules embodiment described above is an example hardware configuration. But, it should be understood that different hardware configurations could be possible. For example, in an implementation where 48 outputs are desirable, the transcoder 102 may include a host processor on a motherboard and enough transcoder modules (e.g., XCODER cards) for producing 48 output streams. An XCODER Module is an example transcoding module 120a-n that can take up to 24 input streams from the switch fabric 206 and produce up to 48 output streams. For this case, each transcoder processor is split in ¼ and each transcoder processor has 4 inputs. So each XCODER Module can take up to 6 processors×4 quarters=24 inputs streams and produce 6×8=48 output streams.

The example transcoder 102 shown in FIG. 2 is also shown with a demultiplexer 204, an encryptor 210, packager 121 such as that shown in FIG. 1, and a management and control plane 212. The adaptive streaming transcoder in FIG. 2 is also shown with two AC or DC PS plug-in ports 214 and 215. The AC or DC PS plug-in ports 214 and 215 represent interfaces to the transcoder. However, it should be understood that any suitable power source may be used to supply power to the transcoder 102.

The demultiplexer 204, or demux, may be included in the transcoder 102 or transcoder module 120 for processing a single input signal and output a plurality of outputs. Demultiplexers take one data input and a number of selection inputs, and they have several outputs. They forward the data input to one of the outputs depending on the values of the selection inputs.

The incoming transport streams 202a-n may be either single (SPTS) or multi program (MPTS) transport streams. Incoming MPTSs are sent to the demux 204 to be demultiplexed into SPTSs. The incoming streams are not encrypted. SPTSs are sent to the transcoding function. The transcoder shall be configured to transcode a single incoming stream to multiple output groups. Each output group is defined by user configuration and contains multi-resolution multi-bitrates output streams. The output streams within an output group maybe GOP/IDR synced per configuration. Each output stream is single MPEG-2 transport streams (SPTS).

The management and control plane 212 may manage additional functionality in the transcoder. For example, the management and control plane 212 may provide the Graphical User Interface (GUI) and configure the system to input and output the user configurable input selections, output resolutions and rates, video/audio parameters, etc. The management and control plane 212 may handle ad-insertion, such as performing a splicer function to insert or replace existing ads within a video stream. The ad-insertion management may be SCTE-30 or SCTE-130 based. The management and control plane 212 may also handle digital rights management (DRM) functionality, black out management, and other management and control issues to supplement the transcoding function of the transcoder.

For content protection, the output TS streams may be encrypted. An encryptor 210 may encrypt streams output processed by the transcoder for added security. In the configuration illustrated in FIG. 2, the transcoder module 120a-n outputs go back to the switch fabric 206, and then to the encryptor 210. From the encryptor 210, the encrypted content is provided to the switch fabric 206 for output by an Ethernet output 202a-n. Video stream encryption is a method used to protect intellectual property in modern digital rights management systems (DRM). The encryptor 210 may encrypt streams for output over the content delivery network. For example, in the case of H.264 video encoding, stream encryption is performed within each Network Adaption Layer (NAL) unit, in byte-stream form using start codes. An encryption key can be self-generated, or configured or acquired through communication to an external key server via management interface.

If the transcoder has the embedded packager option, then the output streams within an output group can be further segmented into ABR streams before being output from the transcoder 102. The ABR output streams will also have associated manifest files that will be generated by the packager 121. In embodiments, the packager 121n provides ABR segments in HLS, HSS or HDS with DRM encryption. The packager 121 can also host ABR segments as an origin server. Thus, if the transcoder 102 contains a packager function, the GbE outputs may include Adaptive Bit Rate (ABR) media segments and manifest files.

In an example implementation described further below, a Network Time Protocol (NTP) NTP server mounted in a chassis receives the Coordinate Universal Time (UTC) and transmits a UTC time for each input stream to the transcoding processor 209a-n, typically thru a local bus like the PCIe switch 206. There is a variable time between the actual UTC time and the time that value is received and processed by the transcoding processor 209a-n. The variable time may result in jitter, which is an undesired deviation from true periodicity of an assumed periodic signal.

Jitter is illustrated by way of an example. Typically, the first UTC time received from the chassis host processor includes some variable delay of x. For purposes of example, assume the first UTC timestamp received is 12:00:00. Responsive to the UTC timestamp received, the transcoder SOC resets its internal clock to 12:00:00. The internal clock then freely runs until the next UTC acquisition time is included in a frame, which may be received on a periodic basis, e.g., every 10 seconds. After the period for receiving a new UTC acquisition time, e.g., 10 seconds, a new UTC time is received. Assume in this example scenario (in which the expected period between UTC times is 10 seconds) that the next time received is 12:00:11. Thus, where the delay built in to the first UTC timestamp is x, the delay of the second UTC time is x+1 second, which is now 1 second later than the internal clock which would have freely been running for the 10 seconds to read 12:00:10. Thus, each time the transcoder SOC gets an updated UTC time, because the transmission time of the frames/stream carrying the UTC time is variable for receipt by the transcoder SOC, the transcoder SOC clock may toggle and produce errors.

As described above, if the UTC time is used as-is when received by the transcoding processor 209a-n, the UTC inserted will cause jitter. In embodiments, a smoothing buffer (not shown) is included in the transcoding processor for dejittering the input. When the UTC is received, an offset is computed, UTC/PCR offset=UTC−PCR, where PCR is a Program Clock Reference (PCR). If it is determined that a) there was no jitter and b) the PCR clock was locked to the UTC, the offset would be the exact same value each time it is received. However, since there is often jitter and the PCR is not typically locked to the UTC, the offset will usually not be the same as the acquisition timestamp. It is noted that drift due to difference in PCR and UTC clocks is small and may be ignored. However, jitter typically results in a UTC inserted that exceeds acceptable levels. For example, certain industry specifications require that jitter be within certain limits, such as no more than +/−10 ms. The smoothing filter may smooth the UTC/PCR offset to reduce the jitter.

The inputs 202a-n to the transcoder module 102, also represented by input stream 101 in FIG. 1, may be compressed or uncompressed and may include source frames. The source frames may be frames of video, such as frames in video sequences. For example, input video signals generally include data corresponding to one or more video frames, where each video frame is composed of an array of picture elements (pixels). A typical color video frame at standard resolution can be composed of over several hundred thousand pixels arranged in an array of blocks. In examples, an encoder provides a compressed input stream 101 to the transcoder 102.

In example implementations, a source frame in the input stream 101 is an IDR frame. The IDR frame may be a type of I-frame such as that defined in H.264 that specifies that no frame after the IDR frame can reference any frame before it. For example, an encoder may send an IDR coded picture (made up of I slices or SI slices) to clear the contents of a reference picture buffer. An IDR coded picture may be used by a decoder to mark all the pictures in a reference buffer as "unused for reference" such that subsequent transmitted slices can be decoded without reference to any frame decoded prior to the IDR picture. Thus, in embodiments the first picture in a coded video sequence received by the transcoder 102 is an IDR picture.

While an IDR frame is also an I-frame, it is not to mean that an IDR frame is the same as an I-frame, i.e., some I-frames are not also IDR frames. For example, the source frame of any picture type may be converted to an I-frame which may be encoded to prohibit decoding referencing to frames encoded before the SP frame, similar to an independent decoding reference (IDR) frame. It is noted that if all I-frames are not IDR frames when producing content for streaming, distortion may result when adjusting playback of the content at the subscriber device.

The disclosed adaptive bit rate transcoder 102 may output transport streams with an IDR at the segment/fragment boundary. Stream transcoding/encoding by the transcoder module 120, while continuous, may then be broken up in to small chunks by a packager, each starting with the IDR. A chunk is a discrete section of content that can be independently decoded. The chunk may include initialization information. A chunk is also referred to herein as a segment or a fragment.

It is noted that a fragment and a segment may be one in the same, or a segment may include a plurality of fragments. For example, fragments are generally smaller than a segment, where a segment is defined by multiple fragments. However, a segment may be equal in size to one fragment, thus making the segment the same thing as the fragment. A fragment may be defined as having a max and minimum range. For example, a fragment may be defined in units of seconds or fraction of seconds. In implementations, a typical fragment is set at 2 seconds where the min could be 1.5 seconds and the max could be 2.5 seconds for example.

Segment boundary points identify locations where switching between stream representations in the output group maintains synchronicity. A segment may have the max duration and the last fragment just before the max duration is the segment boundary. Thus, a segment may be equal to a fragment or may include a plurality of fragments where a segment boundary point is determined by choosing a fragment boundary within the segment.

As per the above, when referenced herein, a fragment boundary point or segment boundary point may refer to the same thing. For example, a fragment and a segment, when equal to each other, may include a segment boundary point that is defined by either of the fragment or the segment, i.e., the fragment boundary point is the segment boundary point since the segment=1 fragment. When a segment comprises a plurality of fragments, the segment boundary point may be defined by the boundary point of a particular fragment within the segment. Thus, as used herein, a segment boundary point can be understood in terms of the segment as a whole, i.e., the segment boundary point, or in terms of a fragment within the segment, i.e., a fragment boundary point.

It may be desirable that a chunk is aligned with boundaries in one component stream in a source multiplex, having boundaries that are explicit for each component (e.g., used in ABR Smooth Streaming techniques). It is also desirable that a chunk may have boundaries aligned to include all component streams in a source multiplex across a target presentation time range, e.g., useful when packaging content in HLS. Such chunk boundary points may be explicitly performed for a main component, e.g., video, and deriving other component boundaries, e.g., audio, from the boundary points of the main component. To support adaptive bit rate streaming, it may be desirable that the transcoder 102 outputs multiple streams within an output group that are scene aligned and GOP/IDR synchronized at the beginning of each segment.

The disclosed transcoding module 120 can align a group of pictures (GOP) from the input stream 101 and/or the transcoding module 120 can align Instantaneous Decoder Refresh (IDR) frames. In video coding, a group of pictures, or GOP structure, may specify the order in which intra- and inter-frames are arranged. The GOP is a group of successive pictures within a coded video stream. Thus, each coded video stream may consist of successive GOPs. A GOP does not have to start with an IDR and thus, if starting with an I-frame, may not need to be aligned. The transcoder's alignment of the group of pictures (GOP) or IDR frames of each profile output from the transcoder 102 may enable a continuous and smooth shifting between different bit rate chunks created for each profile.

However, typically there is a mismatch of time alignment between different stream representations, i.e., profiles, output from the transcoder 102 or, more specifically, a mismatch between the outputs from the transcoding processor 209. For example, for output stream groups output across different devices or from different units that may be in different locations, the output streams often have out of synch source clock times. While each chassis may read from the same source clock server, the two values read by each respective chassis will not be identical. Even if the chassis sends a read request from the server at exactly at the same time, the two chassis will not receive the same value due to the difference in network delays. Delays may also occur from component to component within a chassis, as well as in the respective operating system reading the time. It is further noted that the varying source clock times can cause jitter, causing an interruption when shifting between streams from the different servers when that clock time is used in a boundary point frame.

Due to the mismatch, when the transcoding processor 209 inserts a timestamp into an encoded output stream, the time will be approximate, and different from that of other transcoding processors processing the same input, in the same or in different chassis. Thus, multiple output streams generated from the same input stream, such as multiple bit rate versions of the same input stream, are identified with misaligned timestamps. As a result, output streams generated from the same input but output from two different chassis may not be aligned, as desired, when accessing the same time on a specific frame. Switching between streams, therefore, is not continuous and interruptions in the presentation to a subscriber will occur.

It is noted that while some of the delays incurred by transcoding modules in a same chassis may affect all of the transcoding modules the same, some delays are specific to the different paths taken by the input to the transcoding processor 209 once the stream enters the separate transcoding modules 120. Thus, the timestamp inserted in to an output stream by two different transcoding modules 120 in the same transcoder 102 or in the same chassis may also be misaligned, similar to a misalignment that may occur across chassis. From the perspective of an external observer, switching between these systems would cause time to jump forward and back, a non-desirable effect.

Described in more detail herein are embodiments for inter-chassis or inter-chip synchronization for synching different output stream representations. Disclosed are techniques for inter-chassis or inter-chip synchronization that enable downstream seamless switching. Embodiments are disclosed that enable each of the transport streams within the same adaptive streaming group to have the same segment and/or fragment boundary on the same key or IDR frame for downstream seamless switching. In other words, the disclosed techniques may be used when chunk boundary points must be synchronized across each output stream representation such that the chunk boundary point is placed on the same picture (same PTS) in each output stream representation or profile. In embodiments, an IDR synch is complemented by a boundary point synch.

The disclosed techniques may apply to any scenario with a source clock time to be entered in to a stream syntax, where the source time needs to be the same across streams output from different encoders/transcoders. As described in more detail below, the disclosed techniques may enable multiple transcoder chassis to be used for processing a single ABR group while meeting a boundary point timestamp. The disclosed techniques may be used to meet industry standards ABR requirements. The disclosed techniques enable accurate synchronization across all the streams within a stream group. Specific embodiments described apply to a Network Time Protocol (NTP) sync for Encoder Boundary Point (EBP) implementations.

FIG. 3 depicts an example of a transcoding processor 209 for employing the disclosed techniques. The transcoding module may be a processor or system on a chip (SOC) with components for performing the transcoding function of the transcoder 102. As described in more detail below with respect to FIG. 3, it should be noted that the transcoding functionality in the transcoder 102 shown in FIGS. 1 and 2 is handled by one or more processors/chips 209a-n on each of the transcoder modules 120a-n. The other components depicted and described in the transcoder 102 and transcoding modules 120a-n are shown by way of example for receiving inputs and processing inputs in and out of the modules that perform the transcoding. Thus, the primary function of a transcoder is to transcode, which is shown by the components in the transcoding processor 209, but other configurations may be possible for transcoding directly on a transcoding module board or processor, and other components are described herein to supplement the primary transcoding function. For example, adding an encryptor enables the transcoder 102 to output encrypted transcoded streams. In another example, a transcoding processor may include reordering buffers or encode/decode buffers.

As described above, an input stream may be transcoded by one or more transcoding processors in a transcoder module 120a-n into multiple output stream representations. Transcoding refers to the decoding of an existing file, re-encoding the streams, and usually a re-multiplex of the encoded streams. In general, the transcoding module 120 is a subsystem of the transcoder that changes a stream from one codec format to another. For example, the transcoding module may convert a packetized elementary stream of one bitrate to one or more lower bitrate streams by changing coding parameters, such as media resolution.

A transcoding processor 209 may determine information from source frames from the input 101 for subsequent processing by the transcoding module 102. The source frames are configured to carry information downstream, such as time stamps, clock references, video buffering verification references and other information. Source frames 105 may be also be deleted or dropped to enhance downstream processing at a decoding device. The information determined from the source frames 105 may include timing information 106, such as presentation timing stamps (PTS) read from the headers of the source frames.

Another type of information which may be determined from the source frames is grouping information 107. Grouping information 107 relates to information, other than timing information 104, which may also be utilized downstream for adaptive bit rate chunking purposes. Grouping information 107 may include, for example, an identification of the source frames 105 which occur at scene changes, or an identification of the source frames 105 which occur at repeating regular intervals based on a number of source frames 105 in each interval, or an identification of the source frames 105 which are received as intracoded source frames in the source video bitstream 101.

Shown in FIG. 3 are the logic operations for an input 101 to the example transcoding processor 209, including the operations of a demux 302, a decoder 304, one or more frame rate conversion rescale modules 306a, one or more encoders 308a (where the plurality of rescale modules and encoders are illustrated as 305a-n), and a multiplexer 310. The input to the transcoding processor 209 is represented by transport stream 101 and the output of the transcoding processor 209 is represented by transport out 311. As will be described in more detail below, a PCRin 312 and PCRout 314 are identified, with an end-to-end delay 313 shown between the PCRin and PCRout.

It is noted that the demultiplexing by the transcoding processor 209 is to demultiplex the input stream 101 to separate the video from the stream for delivery to the decoder 304. The audio and data may also be separated from the input stream 101 for separate processing. Thus, the difference is noted between the demuxing that occurs on the input stream for separating video to be transcoded versus the separation of SPTS streams from a MPTS for providing single streams to the transcoding modules 120a-n, as described with respect to the example demultiplexer 204 shown in FIG. 2.

The decoder 304 receives the video from the demultiplexer 302 and decodes at least a portion of input 101, such as the video portion. In example implementations, the decoder 302 performs a full decode. An input to the decoder may be a compressed digital media or stream and the output from the decoder may be a decoded video, commonly referred to as baseband.

At this point in this example, there is still a single representation of the input 101 provided to the decoder 304, and synchronization between streams is not necessary. However, it is noted that the techniques disclosed herein may be employed for multiple decoders if the transcoder has a plurality of decoders and is configured to decode the input stream differently by each decoder. In particular, if an alignment of time at the output of the decoder is desirable, the techniques disclosed herein may be used to align the boundary points. The decoder 304 may receive a compressed input and decode the input in to pixel by pixel images.

The output from the decoder is fanned out or distributed to one or more sets of rescale modules 306a-n and encoders 308a-n. The outputs may first go through the rescale 306a-n prior to entering a respective encoder 308a-n for scaling the input to the encoder to a different resolution.

In embodiments, the transcoder processor 209 includes a plurality of encoders 308a-n, and each encoder outputs a respective multiple bit rate version of the input media content stream. Thus, encoding is done as part of the transcoding process by transcoder modules 120a-n. An encoder is a subsystem of the transcoder 102 that compresses digital media. The input can be an uncompressed digital media or stream and the output is a compressed stream for delivery to consumers in real-time or via storage media. For example, an adaptive bitrate transcoder/encoder module 120 receives an input, such as a PCIe output from switch 206 shown in FIG. 2, decodes the stream, and then encodes the stream by one or more encoders 308a-n. Thus, the outputs from a transcoder module 120 may be one or a plurality of multiple bit rate outputs for a particular media content, where each output is compressed for delivery to the consumer.

In general, encoding includes encoding an audio or video stream into a compressed format. For example, encoding a video stream to a H.264 video. One or more compressed streams are multiplexed into a single byte stream. Typically, those incoming streams are encoded first. The bit rates encoded to by the encoders may be dictated by the client device, and the capabilities or requests for media content at a particular bit rate by the client device. For example, a lower resolution display device may request content at a lower resolution, thus causing the encoder to encode at a lower bit rate for delivery of the lower resolution stream to the client device. Alternately, the client device may be capable of high resolution streams and request content at the higher resolution, and may switch to lower resolution streams if bandwidth resources to the client become scarce. Each of the encoders 308a-n receive the same frame(s) of the decoded and/or scaled input 101.

It is noted that the input to a transcoder module 120 may have been previously encoded by an encoder prior to receipt by the transcoder 102 or prior to receipt by the transcoder module 120. The encoding prior to receipt by the transcoder or transcoder module is distinct from the encoding performed as part of the transcoding process. As shown in FIG. 3, transcoding may involve a decoder followed by an encoder. If the input is compressed, then the decoder can decode the input. If the input is uncompressed, a decoder may be unnecessary and an encoder is used in place of a transcoder. For example, a transcoder may receive compressed video from an upstream MPEG_compliant video encoder, decode and re-encode the streams as part of the transcoding process as disclosed herein, and output an MPEG-compliant stream at its output. The transcoded output, however, may have a different encoded bit rate, video frame size, frame rate, or other format parameters, for example. Outputs from the encoders may be muxed by multiplexer 310 for output from the transcoder processor 209. The transcoder module, such as in the case of an XCODER Module, may contain a field-programmable gate array (FPGA) which receives each of the muxed streams from encoders 209a-n. The FPGA then demultiplexes each stream from encoders 209a-n and outputs SPTSs to the Switch Fabric 206.

As described above, the one or more outputs from an adaptive bit rate transcoder 102, based on the transcodes by the transcoding processors 209, may be segmented in to media segments by a packager 121. For example, a media content, e.g., a video stream of a particular bit rate version of the input stream, is segmented into a plurality of segments (or chunks). As described herein, a chunk or segment is a portion of content and may be a defined portion of the media content, such as a particular scene. The chunk of content may be undefined, such as an arbitrary segmentation of the media content. The segments of the media content may be variable in length, or the segments may be of equal length.

A chunk boundary point (also referred herein as a segment boundary point, a fragment/segment boundary point, or more generally as a boundary point) indicates a segment boundary, e.g., the beginning of a segment/chunk or the end of a segment/chunk. The segment or chunk boundary may indicate an access point that enables random access into media streams. For example, the chunk boundary point may identify a stream access point (SAP).

A boundary point generally refers to the beginning of a frame in the stream containing one or more access units. A segment boundary point may indicate the start of a video access unit, the start of an audio access unit, or the start of a data packet. For example, when applied to a video stream, a boundary point may be assigned to a PES packet containing one or more access units. As an example, a boundary point may be used to indicate fragment and/or segment boundaries used in AVC video, often having fragments of 2 seconds and segments of 10 seconds in duration. The boundary point may be associated with an IDR AU that starts a chunk or segment. As used herein, fragments are shorter than segments. A system can be configured to have only fragments, only segments, or both. If both, then there will be more fragments than segments and on a segment boundary, there may be a fragment boundary on that same frame. The term chunk is used herein as a generic reference to either a segment or fragment.

In embodiments, the transcoding processor/chip 209 in the transcoding module 120 identifies the segment and fragment boundaries. For example, in embodiments, source frames received by the transcoding processor 209 may be modified appropriately to mark chunk boundaries. The chunk boundaries may then be utilized downstream in determining video chunk files. The boundary point may be identified in a structure in a source frame of the stream. For example, chunk boundaries may be identified by marking the header of the corresponding source frame, and/or changing a source frame which relies on referencing other frames (i.e., a "P-frame" or "B-frame") by converting it to an intracoded frame (i.e., an "I-frame").

Thus, by way of the transcoding processor 209, a segment or fragment boundary, as well as other content metadata (e.g. SCTE 35 splicing points) can be identified and marked by the transcoder 102 before being passed to the packager 121. The disclosed transcoder 102 may align GOP/IDR among multiple output streams, making it easier for the packager to segment aligned streams. Aligning the streams by the transcoder 102, for example, may reduce the efforts by the packager of scanning and attempting alignment before segmentation, and reduces the information required by the packager to identify segment boundaries.

A boundary point that indicates chunk boundary points in a bit stream can be used across an aligned set of multi-bitrate transport streams (including audio and data) to create ABR formatted aligned chunks used in adaptive streaming technologies. It is noted that the boundary point may be independent from the GOP structure (e.g., SAP_type, IDR, P, B, audio packet). The boundary point may be identified in a structure in a source frame of the stream.

An Encoder Boundary Point (EBP) is an explicit type of boundary point defined by OpenCable Specifications. The EBP may be carried in an adaptation field at the beginning of each segment and fragment boundary and explicitly indicate chunk alignment. The EBP signals stream/file characteristics to allow for adjusting a stream/file to a specific adaptive streaming technology at a downstream fragmenter/encapsulator device. For example, for video access units completely contained within one PES packet, the first byte of the PES packet payload is the first byte of a video access unit, and only one boundary point, e.g., EBP, is sent with each PES packet header. Thus, the video access unit that is the start of the chunk may be indicated via EBP signaling. Similarly, an audio access unit with an explicit boundary point, e.g., an EBP, indicates the start of the audio chunk and the start of a PES packet. Thus, the access unit that is the start of the chunk may be indicated via the boundary point, such as identified in implementations via EBP signaling.

The transcoder 102 may insert at various points of processing a timestamp based on an internal time based on an internal clock, where the timestamp is a time relative to the transcoder's internal clock time. The timestamp is referred to a System Time Clock (STC) if the stamp is at the PES level or Program Clock Reference (PCR) if the stamp is at the transport packet level. Described herein are embodiments with reference to the PCR, but it should be understood that the concepts also apply to a STC timestamp.

The transcoder's 102 PCR clock may clock locked to the input compressed video stream PCR for transcoding. The transcoder's PCR clock may be locked to the input video clock for encoding. Thus, the PCR clock may not be free-running, but be a continuous clock locked to an incoming PCR.

The PCR clock time value may be inserted in to a packet at some point in the transcoding process. For example, the output from the decoder 304 to the encoding process at 305a-n depicted in FIG. 3 may include insertion of a PCR identifying the internal transcoder processor clock time. The program clock reference may be embedded in to transport packets of the stream. The PCR may be the program clock reference for each video in a stream, such as each video service in a video stream. In an example MPEG-2 encoder system, the PCR system clock frequency is based on a 27 MHz reference clock.

The source frame identifying a chunk boundary point, therefore, may include a PCR timestamp. For example, the PCR may be inserted in to the source frames of each output of the decoder that is distributed to the encoding process 305a-n, where a chunk boundary point is identified in a source frame. Similarly, the output of the encoder may include a PCR inserted to identify the internal transcoder clock time at the output of the encoder 308a-n. In another example, the output from the demultiplexer 302 to the decoder 304 may be a video frame with a PCR inserted.

In implementations, each source frame may include multiple time stamps. For example, in a received stream, a video source frame may include a decoder time stamp (DTS), which informs the decoder when to decode, and a presentation time stamp (PTS), which identifies a time to present the corresponding frame to synch presentation with the program's separate elementary streams (e.g., video, audio, and subtitles). The DTS informs the transcoder 102 at which time the data should be taken from a decoder buffer and decoded, while a PTS for an encoder is the sum of encoder and decoder buffer delays added to the PCR value at the time the picture is written to the encoder buffer. The time stamps, such as DTS and PTS, are each defined with reference to the PCR. Each time a video frame is sent between components in the transcoder processor 209, the frame may include a PCR timestamp.

It is noted that the PTS is included in the received stream, and is identical between different output stream representations as generated using the techniques disclosed herein, because the PTS of the input stream is used to derive the output PTS of the corresponding frames in the output stream representations. Thus, the PTSs are the same, but the time at which they are delivered can vary between streams, which may cause a variable encoder/decoder buffer delay. For example, the encoder and decoder buffer delays may be due to an encoding process, e.g., an MPEG encoding process. Since encoded frames are each different sizes, an accordion type buffer is needed in which the encoder and decoder both make up the accordion. The end to end delay of the accordion is constant, but the delay in the encoder buffer and decoder buffer are not constant. For example, if the current delay in the encoder buffer is small, the current delay in the decoder must be large and visa-versa such that the sum is constant.

An input stream 101 may include an acquisition time that indicates a time at which time the transcoding processor 209 acquired the stream or a packet within the stream. It is noted that the acquisition time is separate from timestamps defined relative to a program clock's clock reference. In example implementations, the acquisition time is Network Time Protocol (NTP)-derived. In some transcoder implementations, transcoders are required to define acquisition time values that are derived from NTP or an internal clock that is synchronized to NTP. NTP is a networking protocol for clock synchronization between computer systems over packet-switched, variable latency data networks.

As described herein with respect to an NTP time, the NTP time is sent periodically to a transcoder processor from the host processor (chassis). Each time the NTP is received, an offset is computed between the NTP and current PCR, and then dejittered, thus updating the acquisition time based on the offset for use in alignment. However, one could attach an acquisition time to each packet if the packets arrive without jitter, and then use that NTP acquired value.

NTP is a common synch protocol for synchronizing participating computers to within a few milliseconds of Coordinate Universal Time (UTC) time. The Coordinate Universal Time (UTC) is the primary time standard by which the world regulates clocks and times. Many computer servers, online services, and other entities rely on the UTC time as a universally accepted and common time clock. The reference clock used by the NTP to define the time for an operation may be derived using the UTC as a reference time. Thus, examples are described herein in which the acquisition time identified in the input stream for one or more boundary points used is based on the UTC.

The acquisition time may be a time of day or wall clock time value captured by the host processor (chassis) upon receipt of a stream over a network. It should be understood that examples described with respect to the use of a NTP UTC time for a frame are representative only, and that other sources of the acquisition time of the stream by the chassis may be included in the boundary point frame for indicating the acquisition time of a particular boundary point/frame.

Referring back to FIG. 2, the GbE inputs/outputs 202a-202n provide the input to the switch 206, which may include the NTP timestamp captured at the point of receipt by the chassis of the input stream. For example, the host chassis may have an NTP client which queries the UTC from the NTP server once a minute. This process is independent of the input stream. As soon as the NTP client gets the UTC, it sends that value to the transcoder processors, and the transcoder can then use the UTC to compute the UTC/PCR offset. Thus, the UTC is not used to reflect the input stream itself, but rather the PCR that is derived from the stream.

As described above, implementations may require that the external clock reference time, i.e., acquisition time, e.g., the NTP UTC time, be the exact same value across all output streams in the same group for synching between streams. For an output stream group within the same device, the acquisition time, e.g., the NTP UTC time, is the same since the external clock used to define the acquisition time is the same for each stream input to the device. Thus, if the device is a single transcoder processor, each processor receives the NTP and uses that same NTP/PCR offset for each output. However, if the device is a chassis, the acquisition time is not the same for each stream input to the device since each transcoder processor in the chassis will receive the UTC from the host at slightly different times.

However, there are differences between the actual UTC time and the time that value is received and processed by a transcoding processor 209. For example, delays introduced by coding, multiplexing and transmission can cause a variable amount of delay for video packets arriving at a component within the device, such as at the transcoder 102, or at a component within the transcoder itself, such as decoder 304 in the transcoding processor 209. As described above, jitter may also occur.

The timestamps in a plurality of output stream representations, therefore, may vary between different chassis, different transcoding modules, and even different transcoding processors in the same transcoding module. For example, network delays to a first chassis may be different from network delays to a second chassis, resulting in different UTC times recorded as the acquisition time in the streams delivered to the transcoding processor in each chassis. The variable timestamps interfere with proper alignment of frames within the plurality of streams, such that switching between streams is irregular. Further, as described above, compensations for jitter may also be desirable.

Between the NTP server and client, there is the cloud, so the transfer time from the server to the client is variable from chassis to chassis and time to time, depending on IP traffic and paths taken. The NTP client attempts to compensate for the transfer time, but can only be accurate to a specific duration. Thus, for output streams in a group that reside across different devices in the same location or across devices that reside in different locations, currently there is no way to ensure the same acquisition time, e.g., the NTP UTC time, will be set the same across all of the streams, i.e., the values between clients is not exact. Further, to transfer the time from one processor to another introduces more variable delays which also cause time mismatches. Thus, while each chassis may read a NTP UTC time from the same NTP server, such as via a NTP client, the values read for of each chassis may not be identical.

Accordingly, synchronizing between streams based on respective acquisition times, e.g., the NTP UTC time, is difficult for output stream groups that reside across different devices or different components in the same or different locations.

Further, unlike a system that has ready access to wall clock time that can include NTP time as a frame is created, the transcoding processor 209 has an acquisition time processed by the device (e.g., chassis, receiving device, encoder, etc.) that transmits the stream to the transcoding processor 209, and the device is unaware of an acquisition time specific to the point at which each frame is output from a decoder 304. Specifically, the external clock used to define a stream's acquisition time, e.g., NTP UTC derived time, may not be available on demand for insertion by a process internal to the transcoding processor 209. For example, the acquisition time may be the time derived from an NTP server at the point that a transport packet was acquired by the chassis. But the acquisition time inserted is not specific to the time a frame is output from a decoder or other processing that occurs within the transcoding processor 209. At the time of receipt of the stream by the chassis, the chassis is unaware of specific frame content for capturing an exact time relative to a segment of the stream. For example, specific frame content is not determined until the decoder 204 in the transcoding processor 209 processes and decodes the stream.

Disclosed herein are techniques for identifying, within the transcoding process in the transcoding processor 209, a time associated with boundary point data that indicates a time at which a component within the transcoding processor 209 processed or output the segment with the boundary point. As described in more detail below, the boundary point timestamp is based on the acquisition time and can be inserted in to a chunk boundary point frame or, in the EBP example, the boundary point timestamp may be inserted into an EBP structure. As also described below, a PTS time may be used to determine the expected NTP value at the PTS time. In this way, an expected NTP time can be determined at a point in the transcoding process by the transcoding processor 209.

In embodiments, the transcoding module 120 or transcoding processor 209 may derive the acquisition time from the NTP time in the EBP structure of the input content stream. For example, an acquisition time may be an NTP timestamp may be inserted into an adaptation field in an EBP. In embodiments, the transcoder generates its own NTP time from an NTP signal received from an NTP server or NTP client.

As disclosed, the group of encoders that output corresponding streams, e.g., different bit rate versions of the same input stream, forms an ABR output group. For ABR output groups that reside in multiple transcoding modules or processors in the same chassis, a master encoder is selected for the ABR output group. The chassis' NTP client receives the UTC and transmits the value to a master encoder/transcoder transcoding processor 209 designated for the ABR output group. The output group may include a master encoder and a plurality of corresponding slave encoders. The master encoder may serve as the master to encoders within the same transcoding processor 209, for example, or as a master to encoders across transcoding modules 120. The encoders in the output group produce ABR output streams, referred to herein as an ABR output stream group.

If the transcoding processor 209 changed the offset as each new UTC was received, the UTC placed in the EBP would jitter. Thus the UTC is computed based on the PTS and UTC/PCR offset, UTC=PTS+UTC/PCR offset for sending to the master encoder. When the UTC is received, the master transcoding processor 209, using the received UTC value, creates an offset between the PCR of the stream as stamped by the master transcoding processor 209 and the UTC time. The IDR frame at the boundary point has a PTS. The last computed UTC/PCR offset is used to compute the UTC value for the EBP.UTC(EBP)=PTS+offset. Since there is a variable delay between the time the NTP client receives the UTC and sends the UTC to one or more transcoding processors 209, the transcoding processors 209 must slew (i.e., modify) the offset to the new PCR/UTC offset. Specifically, the master transcoding processor 209 computes an updated UTC/PCR offset based on a recently captured UTC time, such as the most recent UTC timestamp. The modified/updated offset value is used to compute the UTC value for a boundary point frame, such as the UTC for insertion in to the EBP at the segment and fragment boundary.

Thus, the transcoding processor 209 will use a previously computed UTC/PCR offset so that each transcoder processor will be able to use the same UTC/PCR offset for a specific boundary point. The UTC inserted is computed based on the PTS and UTC/PCR offset, UTC=PTS+UTC/PCR offset.

The UTC(EBP) is computed prior to being inserted in a structure of the stream, e.g., an adaptation field in an EBP structure. Computing the UTC prior to insertion in to the EBP adaptation field provides time for the PTS and UTC value to be sent to the slave transcoding processors in the same output group. The slave transcoding processors will use the UTC value sent by the master for the segment and fragment EBPs. Thus, instead of each encoder computing a different PCR offset, the master channel produces the offset to be used by each encoder.

Further, by computing the offset early, the last offset is used to calculate the UTC value for the current EBP, thus computed prior to inserting the UTC value in to an adaptation field. The PTS and UTC values of the master can then be sent to the slave transcoding processors in the same group. The slave transcoding processors will use the master time for its EBP. The outputs from the encoders are transmitted, possibly to a multiplexer.

As described above, despite a delay in data transmissions in a chassis, the disclosed techniques enable the time stamp in a frame to be the exact same value in every same frame in the plurality of stream representations from the multiple encoders. Each time stamp can be output with the exact same value. For example, for NTP 64 bit-timestamp format having a 32 unsigned seconds field counting from the prime epoch of 1-Jan 1900 00:00:00, the time stamps would be identical.

The acquisition-time-derived transcoding processor time can be applied to a PES header of the stream, or put on any video access unit or group of audio access units. As described above, the acquisition-time-derived transcoding processor time may be applied to each boundary point or frame associated with a boundary point at the output of the decoder, between the decoder and encoder, or prior to the input to each encoder. Thus, the transcoding processor 209 is able to insert the acquisition-time-derived transcoding processor time based on knowledge of the frame content but prior to encoding the decoded video input portion of an input stream 101.

In an example, the decoder 304 in the transcoding processor 209 may use frame data to determine a boundary point time at the output of the decoder. The time value in the boundary point may be derived by the transcoder from an external time reference. For example, the decoder 304 can include a timestamp in its output based on an expected NTP value, where the timestamp is associated with a boundary point frame decoded by the decoder 304 for output to the encoding process 305.

The technique described above for synchronizing timestamps between frames in multiple stream representations within the same chassis may not be applicable when the chassis are separate. For example, if more than one chassis is not be co-located, the network delays for respective chassis may be quite large and quite different. Thus, computing the NTP time earlier and sending it to slave encoders as described above with respect to multiple encoders in the same device, may result in unacceptable delays for chassis that are subject to very different delays. For example, if the designated master encoder cannot deliver the UTC time to the slave encoders prior to the encoding by each respective encoder, then the slave encoders will not have the updated UTC time for use in the encoding process. Thus, while the master may send the UTC pair to the slave over IP, since the IP network delay may be large on the order hundreds of milliseconds, there is no guarantee the master NTP/UTP data will reach the slave encoder/transcoder on time.

Embodiments are disclosed herein for computing a UTC/PCR offset periodically. In embodiments, the PCR does not need to be at a segment or fragment boundary. The UTC/PCR offset is computed prior to the NTP PES insertion time. In embodiments, the computation time must be early by at least the worst case input delay, plus information traffic delay between chassis. Input delay is the difference between arrival time of the source video or transport between chassis. The information traffic delay is the delay to transmit the PCR/UTC information from one chassis master transcoding processor 209 to another chassis slave transcoding processor 209.

Figure 4:
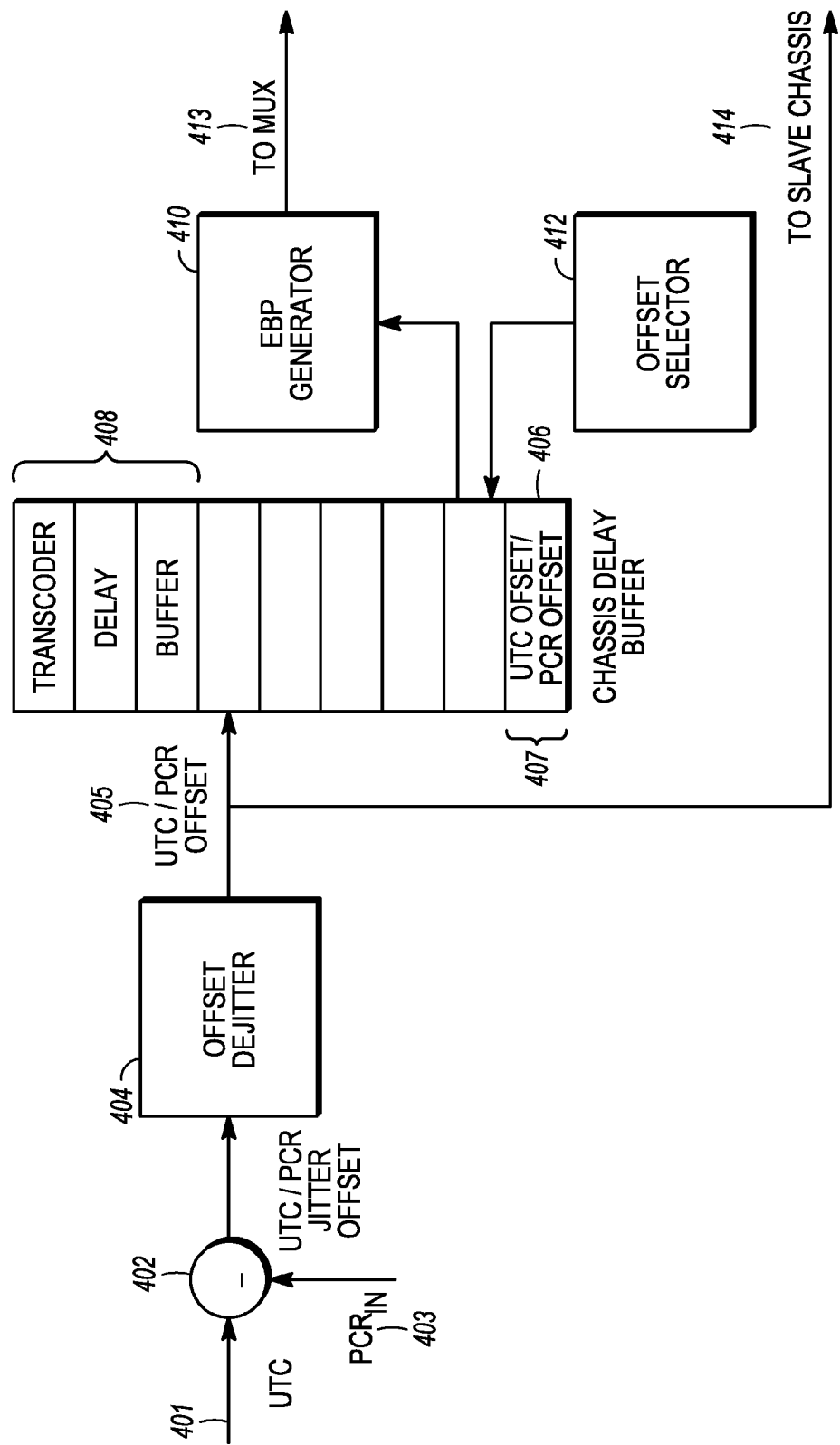
FIG. 4 depicts an embodiment as disclosed for synchronizing between separate chassis.

FIG. 4 depicts an embodiment as disclosed for synchronizing between separate chassis, wherein FIG. 4 depicts the processing by a master transcoding processor 209. The UTC/PCR offset is computed by the master transcoding processor 209 as in the single chassis case. At 409, the UTC/PCR offset is computed by the master transcoder at the time the UTC is received 401. The UTC/PCR offset is computed early by this chassis delay. The PCR may be used as reference to determine the time difference (e.g., using the offset of PCR/UTC described above with respect to FIG. 3). And PCR offset can be used to determine an accurate NTP relative to PTS since PCR and PTS are on same time base. Since the UTC is inserted at a PES header with PTS, the time difference is PTS-PCR.

The UTC/PCR offset 402 may be jittered and input to an offset dejitterer 404. The UTC/PCR offset 405 and corresponding PCR 403 is stored in a memory buffer 406 as UTCoffset & PCRoffsetPair, as shown by the example pair 497. The example chassis delay buffer 406 is large enough to hold UTC offset pairs for the entire chassis delay and, if the transcoder delay is longer, additional UTC/PCR pairs may be stored in memory 408. This memory 408 will also contain a set of UTC/PCR offsets and PCRs.

The offset selector 412 identifies the most recent PCR in the UTC/PCR pairs in memory 406/408. Each memory container has a UTC/PCR offset plus the PCR. The most recent PCR that is less than a current PTS time is identified, and the corresponding UTC/PCR pair is selected for insertion in to the boundary point source frame. For example, the UTC/PCR pair is used to compute the UTC inserted in to the EBP for use in an EBP frame. Thus, the boundary point source frame uses the pair that has the latest PCR value which is less than the PTS.

The EBP generator 410 inserts the UTC time updated based on the UTC/PCR offset in to a source frame or boundary point frame. In embodiments, at the IDR, the UTC/PCR offset used to compute the UTC is put in the EBP based on the IDR PTS. The EBP generator is described by way of example, and it should be understood that any appropriate field for inserting the timestamp is contemplated.

After producing the PCR/UTC pairs, the pairs are also provided to a slave chassis at 414, as described in more detail below with respect to FIG. 11.

Referring back to FIG. 3, a transcoder has an end-to-end delay (PCROut-PCRin) representing the transcoder end-to-end delay 313 (TcdrDly). For transcoders that use the same timestamps at the output that arrive at the input (the PTS of the incoming frame and timestamp of output frame are the same), the PTS can be tracked. For example, if the frame identifies a scene change, the exact same PTS is put on the output frame. The PCR at the input of the transcoder is PCRin, the PCR at the output of the transcoder is PCRout. Thus, at a given time the PCRout=PCRin−TcdrDly.

If the UTC/PCR offset is computed at PCRin, then the UTC/PCR offset is computed early and, if early enough to compensate for chassis to chassis delay, the PCRin is stored in memory. However, if the TcdrDly is less than the chassis-to-chassis delay, the slave chassis will not have the corresponding UTC/PCR pair in memory since the UTC/PCR used in the master chassis for the IDR frame would not yet have arrived. This problem is solved by adding an 'offset pair' to the PCR, such that the PCR is increased by an amount that matches or exceeds the chassis-to-chassis delay, i.e., PCRoffsetPair=PCRin−(chassisDly−TcdrDly). If TcrdDly is greater than the chassisDly, no such 'offset pair' is needed and PCRoffsetPair=PCRin.

If the UTC/PCR offset is computed at PCRout, then the UTC/PCR offset is not computed early. In this case the UTC/PCR offset will be used chassisDly later. The UTC/PCR offset is stored with the PCR in memory; however instead of using the current PCR, the PCRoffsetPair=PCRout+chassisDly. The PCRoffsetPair=PCRout+chassisDly algorithm is used if the transcoder does not use the same output PCR as the input PCR.

Computing the PCR early enough, thereby enabling computation of the UTC/PCR offset (PCR-UTC) at the master, to be sent out to the slave encoders prior to the point at which the slave encoders encode. In this manner, if the transcoder delay is not that long or chassis-to-chassis delay is much longer, the UTC/PCR offset and PCR value are held for future use, forcing it for a later insertion.

When it is time to insert the UTP at a specific PTS, the offset used will be found in the memory buffer. The code will look in the buffer for the most recent PCR that is less than the PTS.

Figure 5:
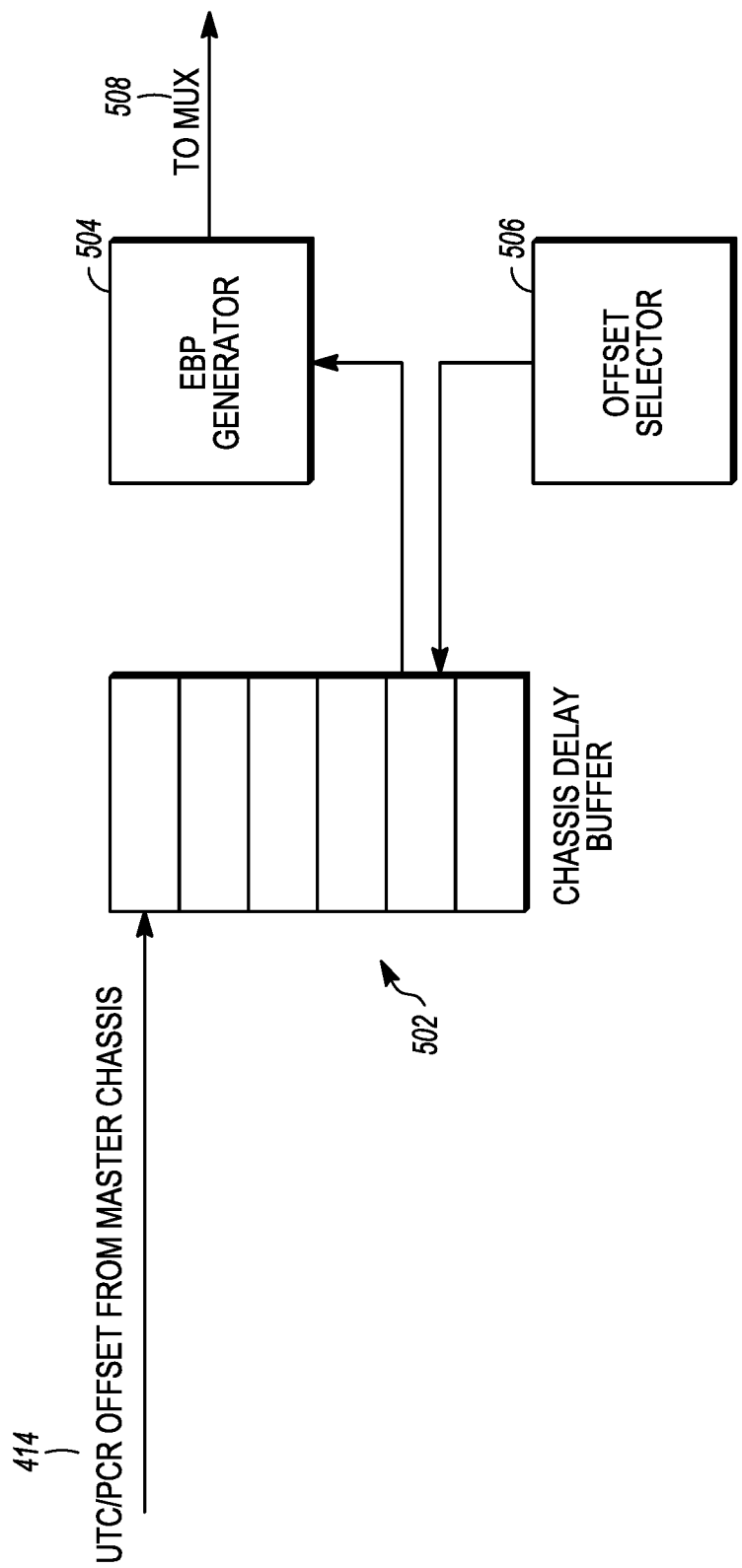
FIG. 5 depicts the processing performed by a slave chassis that receives a UTC/PCR offset pair from a master chassis.

FIG. 5 depicts the processing performed by a slave chassis that receives a UTC/PCR offset pair 414 from the master chassis. The slave chassis receives the UTC/PCR offset pair and stores the pair in a chassis delay buffer 502, similar to the master chassis delay buffer 406. The EBP generator 504 inserts the offset pair on the same frame similarly to the selection by the master chassis by selecting the most recent offset pair by the offset selector 506 for computing the NTP. Thus, the offsets selected between the master chassis and slave chassis will be the same, because the PTS is the same in each frame, the EBP/NTP time is also the exact same value.

Figure 6:
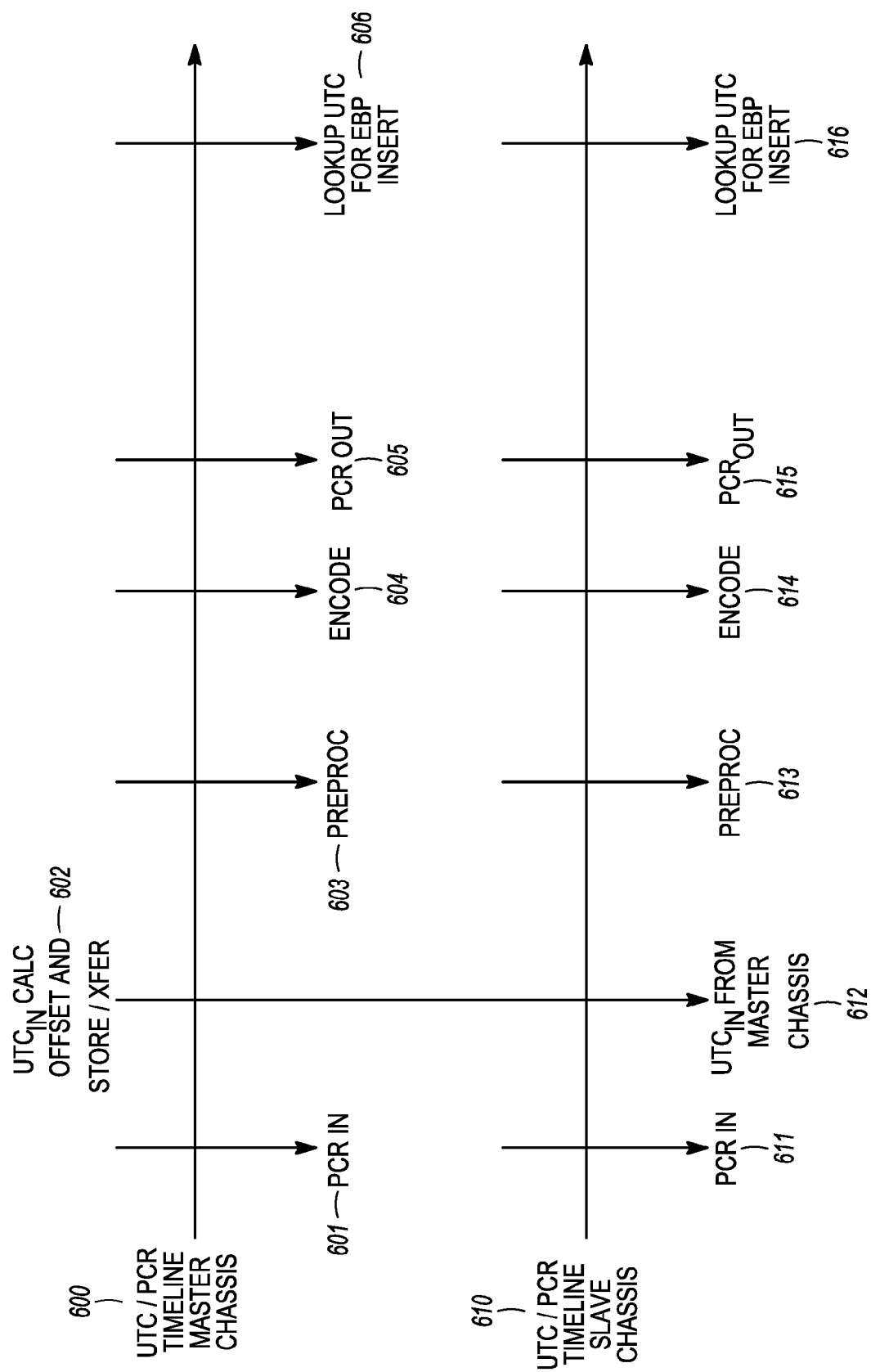
FIG. 6 illustrates an example timeline of transmissions between a master encoder and a slave encoder.

FIG. 6 illustrates an example timeline of transmissions between a master encoder and a slave encoder. The top line 600 illustrates the processing in a master channel, and the bottom line 610 illustrates the processing in a slave channel. The PCRin 601 and PCRin 611 represent the PCR in received at each chassis. The master chassis captures the UTCin at 602, calculates the offset, stores it locally, and also transfers the UTCin offset to the slave at 612. Both the master chassis and slave chassis have a preprocessor 603, 613, respectively, an encoder, 604, 614, respectively, and a PCRoutput 605, 615 respectively from each of the master and each of the slaves. At 606, the master chassis looks up the UTC offset from local storage based on the PCRout 606 for insertion in to the boundary point frame, and at 616 the slave chassis looks up the UTC offset from local storage based on the PCRout 616 for insertion in to the boundary point frame. The UTC offset used will be found in the memory buffer. The code will look in the buffer for the UTC offset paired with the most recent PCR that is less than the PTS. The UTC offset identified from storage for both the master and the one or more slave chassis is determined based on the master chassis, such as the UTC offset value provided to the slave chassis at 612. The offsets selected between the master chassis and slave chassis will be the same, because the PTS is the same in each frame, the EBP/NTP time is also the exact same value. Thus, the UTC identified from storage at 606 and 616 for insertion in to corresponding boundary point frames of respective streams from each chassis is identical.

Figure 7:
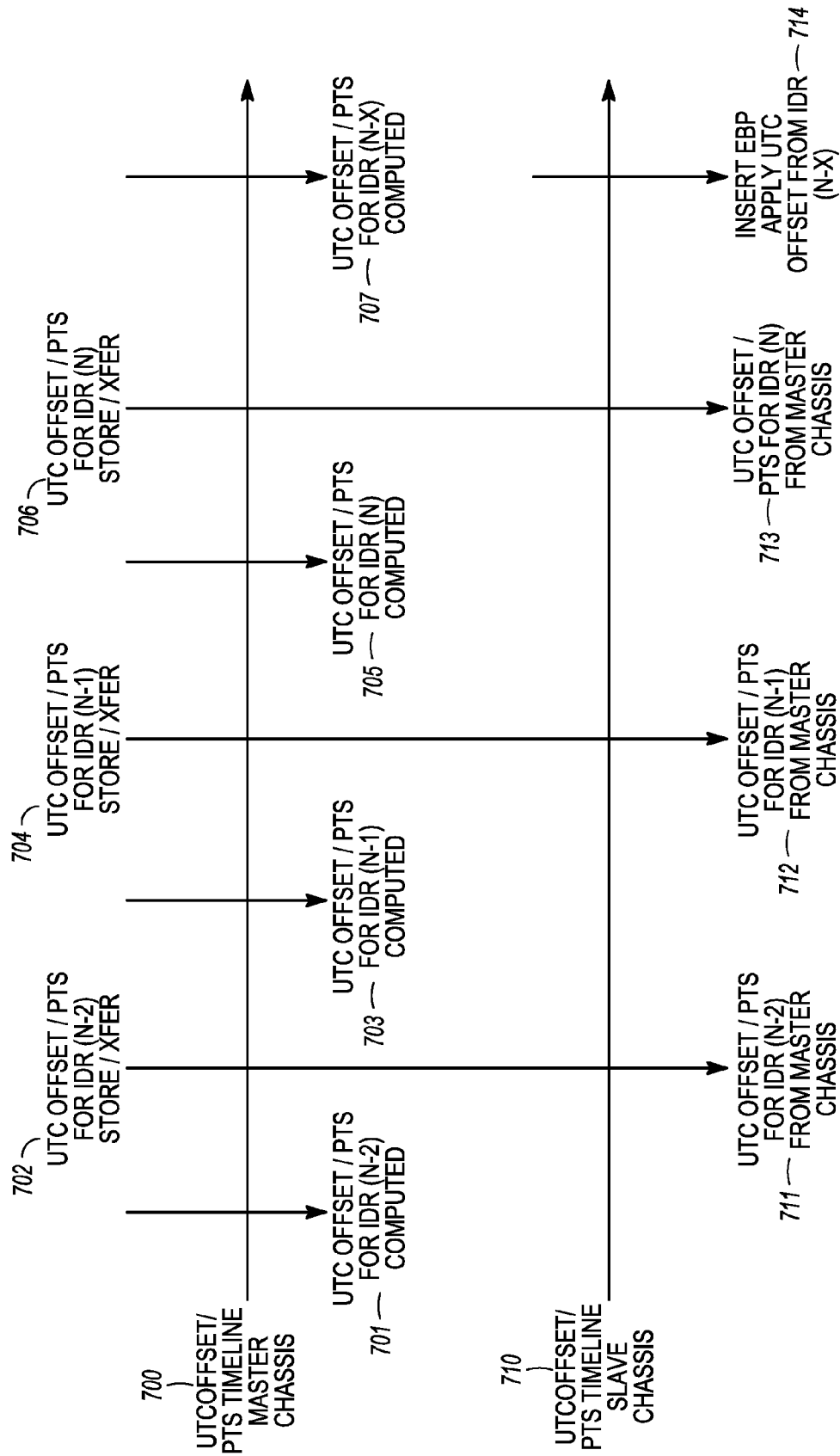
FIG. 7 illustrates another example timeline of transmissions between a master channel and a slave channel.

FIG. 7 illustrates another example timeline of transmissions between a master channel and a slave channel. The top line 700 illustrates the processing in a master channel, and the bottom line 710 illustrates the processing in a slave channel. In this example, the offset is computed at a single chassis at the output. As described in FIG. 6, each time the chassis receives an IDR, an offset is computed. For example, FIG. 7 depicts IDR(n−2), IDR(n−1), IDR(n) to illustrate the receipt of three IDRs, the master chassis computing a respective UTC offset/PTS 701, 703, and 705 for each received IDR. The PTS of the UTCoffset/PTS pair is the value of the PTS for this IDR. Each time a UTC offset/PTS pair is determined, the master chassis transmits the offset and corresponding PTS to the slave chassis, as shown by 702, 704, and 706.

However, as shown at time (n−x) 707, instead of the master chassis inserting a currently computed UTC offset in to the boundary point frame, e.g., EBP, the UTCoffset/PTC pairs are stored in memory at 702, 704, and 706, in addition to transmitting the UTCoffset/PTC pairs to the slave chassis. At 707, a previously computed UTCoffset/PTC pair is inserted in to the boundary point frame. For example, at time (n−x) at 707, the UTC offset for IDR(n−2) may be inserted in to the EBP, the UTCoffset/PTS pair for IDR(n−2) having been stored in memory and likewise transmitted to the slave chassis for storage. In other words, the master chassis bypasses the UTC offset for the present EBP. Similarly, interim offset/PTS pairs computed for received IDRs may not be used, but still stored and transferred to the slave chassis. For example, in the example described above whereby the offset/PTS pair determined at (n−2) 701 is used at time (n−x) 707, the offset/PTS pair 704 corresponding to IDR(n−1) and the offset/PTS pair 706 corresponding to IDR(n) are not used at this point by the master chassis, but are stored locally and transferred to a slave chassis. Thus, for a subsequently received IDR, the UTC offset/PTS pair computed and stored by the master chassis for a previously received IDR may be used for insertion in the boundary point frame.

It is noted that in the example shown in FIG. 7, the offset inserted to the EBP at the point of receiving IDR(n–x) may be the offset computed upon receipt of any previous IDR, such as the example offsets shown computed at the receipt of IDR(n–2), IDR(n–1), or IDR(n). Thus, the use of the offset computed at IDR(n–2) is described by way of example, but the x in the (n–x) at 707 may be variable and represent any previously stored IDR offset computation. Although x is variable, the chosen x must be the same value for the master and slave chassis.

For purposes of example, assume the UTC offset inserted in to the EBP at the receipt of IDR(n–x) 707 is the offset previously stored for IDR(n–1) 704. Thus, the offset computed for the previous IDR is used as the offset corresponding to a later received IDR, delaying the offset in this example by one IDR frame, i.e., UTC=PTS+UTCoffset(n–1). Similarly, the slave chassis stores the UTCoffset/PTS pairs in memory and for each IDR, inserts the PTS of IDR(n–1) in the EBP. Computing the offset early, at time n, but not using the offset until time n+x, may be desirable when the difference between the UTC and PCR clock is a slow drift and the use of the delayed offset has a negligible effect on the EBP time.

In embodiments, the delayed IDR offset insertion technique described with respect to FIG. 7 is implemented when the worst case chassis to chassis delay is less than the shortest IDR period. For example, if the period between receiving IDRs is too small, but two times (2×) the shortest period would be long enough to accommodate for chassis to chassis delay, then the PTS and offset previously computed and stored at IDR(n–1) can be used. This can be increased to three times (3×), four times (4×), etc. By way of example, assume the DR period (time between receipts of the IDR) is one second or greater. If the chassis to chassis delay is less than one second, then the delayed IDR offset computation may be selected for insertion in to a present EBP. However, if the chassis to chassis delay is two seconds long and the IDR period is one second, the offset for IDR(n–1) will not have been computed yet and stored yet. However, an offset for an IDR(n–2) may have been computed and stored, and thus the offset/PTS computed for IDR(n–2) may be used for insertion in to the EBP.

In embodiments, the EBP is modified externally with the same UTP by the packager or other system receiving the output from the multiple chassis.

Figure 8:
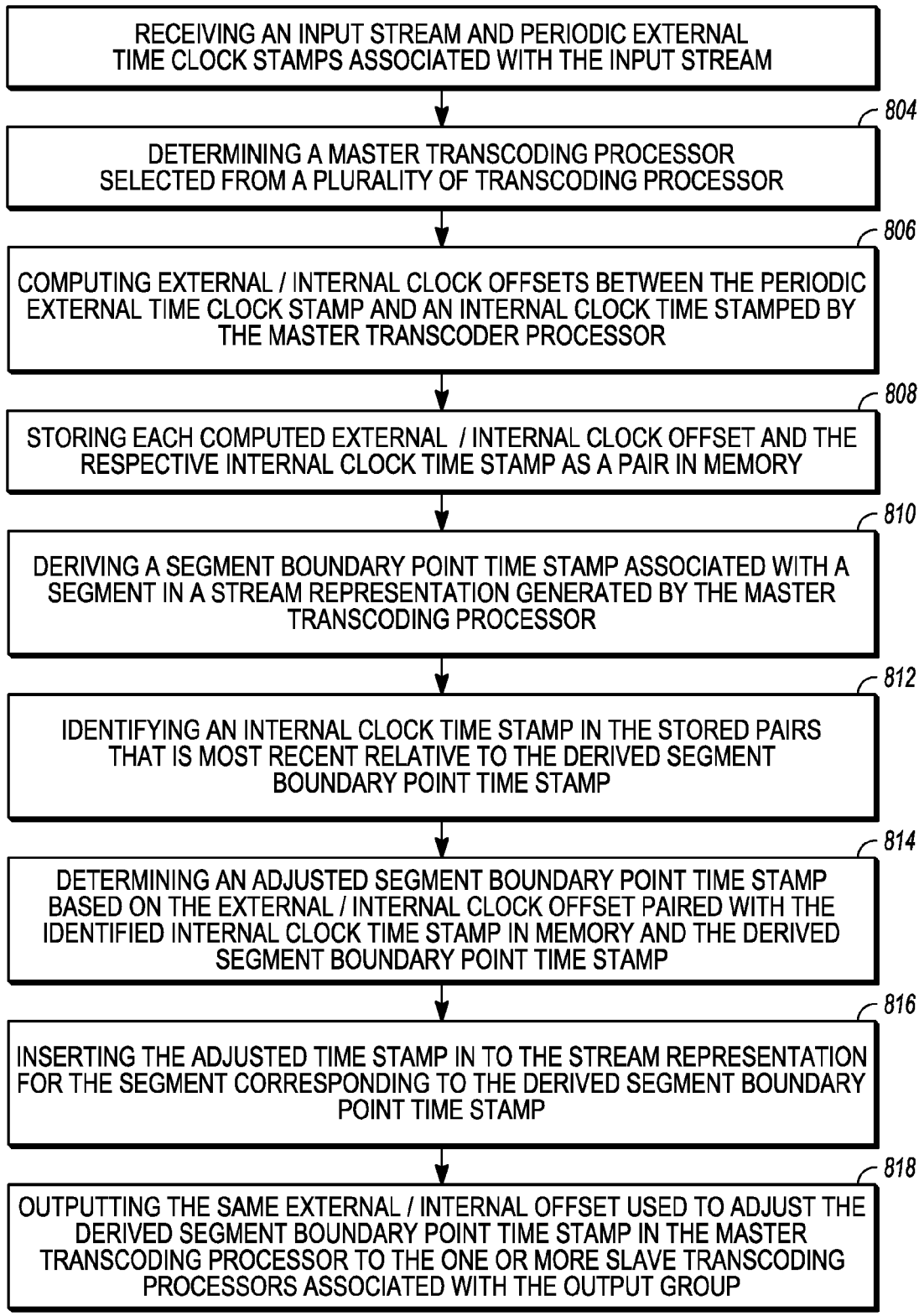
FIG. 8 depicts a flow diagram for synchronizing between multiple stream representations in an output group.

FIG. 8 depicts a flow diagram for synchronizing between multiple stream representations in an output group. As described herein, at 802 an adaptive transcoder may include an input for receiving an input stream and periodic external time clock stamps associated with the input stream. The transcoder may include an internal clock for time stamping streams at various points of processing within the transcoder. A content delivery network may be the source of the input stream to the adaptive transcoder via a chassis that hosts the transcoder. The transcoder may include a switch that couples the input to one or more transcoding modules.

Each of the one or more transcoding modules may host a plurality of transcoding processors. Via the transcoding modules and the respective transcoding processors, the transcoder may generate from the input stream a plurality of stream representations. Each of the plurality of representations of the input stream may have one or more corresponding segments within the output group.

An output group may be made up of a plurality of stream representations generated from a single stream input to the transcoder, such as the outputs from one or more of the transcoding processors hosted on a single transcoder. An output group may be made up of a plurality of stream representations generated from corresponding input streams input to a plurality of transcoders. For example, a single chassis may include multiple transcoders, each with their own plurality of transcoding processors. In another example, more than one chassis may host one or more transcoders each with their own plurality of transcoding processors. Thus, an output group may span multiple transcoding processors, multiple transcoders, or even multiple chassis.

The transcoder's internal clock may stamp streams at various points of processing within the transcoder. The time between a periodically received external time stamp associated with the input stream and a transcoder's internal clock time stamp of one or more segments may be variable. The variation in time stamps may create misaligned timestamps between corresponding segments in the plurality of stream representations.

At 804, a master encoder is selected from the plurality of transcoding processors. For convenience, the following aspects of the disclosed techniques is described with respect to functionality of the master encoder, but it should be understood that the transcoder or chassis hosting the transcoding processor with the master encoder may facilitate the processing of such aspects.

The master encoder may compute external/internal clock offsets between the periodic external time clock stamp and an internal clock time stamped by the master transcoder processer at 806, and at 808 the master encoder may store a computed external/internal clock offset and the respective internal clock time stamp as pairs in memory. At 810, the master encoder derives a segment boundary point time stamp associated with a segment in a stream representation generated by the master transcoding processor, and at 812 the master encoder identifies an internal clock time stamp in the stored pairs that is most recent relative to the derived segment boundary point time stamp.

At 814, the master encoder determines an adjusted segment boundary point time stamp based on the external/internal clock offset paired with the identified internal clock time stamp in memory and the derived segment boundary point time stamp. By inserting the adjusted time stamp in to the stream representation for the segment corresponding to the derived segment boundary point time stamp at 816, the transcoder is able to output the same external/internal offset used to adjust the derived segment boundary point time stamp in the master transcoding processor to the one or more slave transcoding processors associated with the output group at 818.

In embodiments, the disclosed techniques describe synchronizing boundary point frame times between a plurality of streams using the acquisition-derived time captured when the stream is output from the decoder, prior to the input of frames in to the encoder. Thus, the NTP time may be derived for the stream at the time the stream exits the decoder. However, this point in the transcoding process for synchronization is described by way of example, and it should be understood that the techniques may apply to synchronization at different points in the transcoding process for a single stream that is or will be processed in to two or more outputs. For example, the disclosed techniques may apply to a boundary point frame time derived from a time captured when a source frame, e.g., a source video frame, is about to enter a reordering buffer at an encoder, or when the decoder within the transcoder decompresses the access unit (also referred to as a DTS time), or a time at which the access unit is reordered and displayed (also referred to as PTS), or a time when the decoded picture is about to enter the encoder, or a point when the re-encoded access unit is about to be multiplexed with audio and other data. In embodiments, the NTP time is more widely used by entities in the content delivery industry, and may be more accurate than other external clock sources.

Figure 9A:
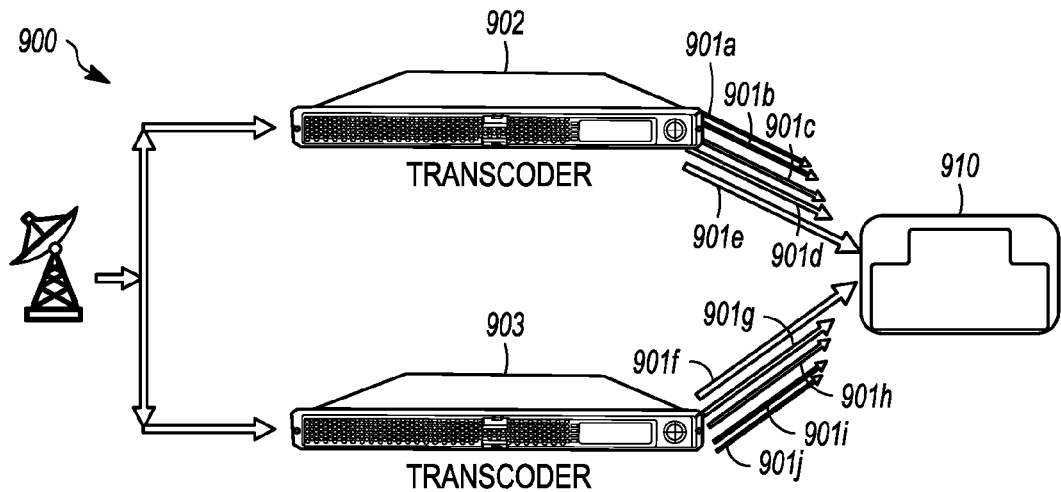
FIG. 9A depicts an example of active/active chassis redundancy.
Figure 9B:
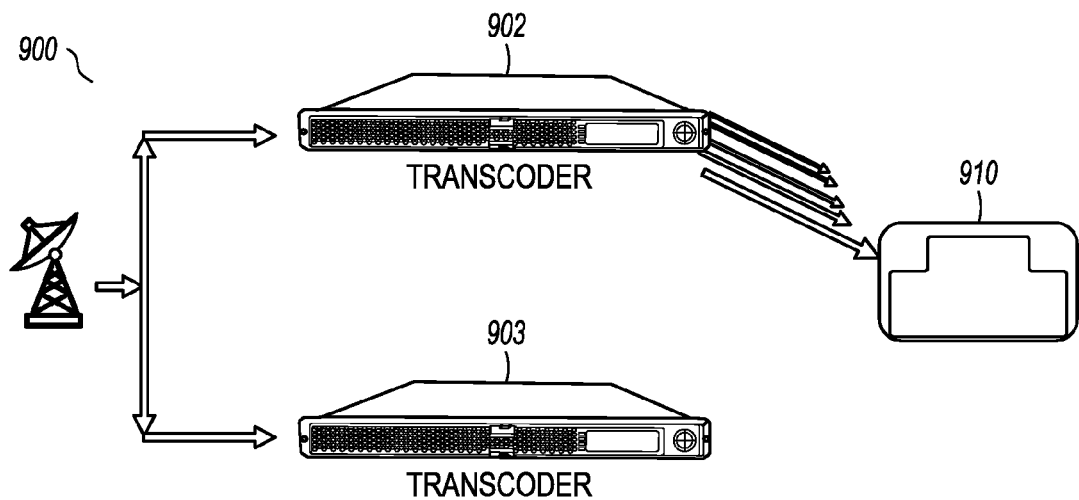
FIG. 9B depicts the active/active chassis redundancy that offers non-stop services with a MBR stream output subset.

An example of a ABR system configuration in which a mismatch between outputs may occur is shown in FIGS. 9A and 9B. The transcoder 102 described herein may be designed with full redundancy support in each level and the major transcoding function is done by DSP based plug-in boards. The host CPU on the motherboard provides an optional Packager function if implemented, as well as system management and controls.

FIG. 9A depicts an example of active/active chassis redundancy 900, and FIG. 9B depicts the active/active chassis redundancy 900 that offers non-stop services with a MBR stream output subset. FIG. 9A depicts a dual chassis system feeding one packager 910, so one ABR group has some streams from each of the 2 transcoders. In this example, assume a multi-bitrate profile includes 10 bit rate streams 901a-j, which can be set up as a 5-5 split between two transcoders 902, 903. The disclosed IDR synchronization may allow each program's MBR stream profile to be split across a 1+1 chassis configuration for the active/active system redundancy and non-stop service output to the ABR packager 910. Thus, the live/linear TV single bitrate resolution video stream input per service may be output by the transcoder as a multiple bitrate stream output to the ABR packager in a MPEG transport stream group.

FIG. 9B depicts a high level implementation of the techniques disclosed herein in which both the ABR packager 910 and the client handle the input interruption to provide seamless user viewing experience. Two transcoder chassis 902, 903 are shown in FIG. 9B, one transcoder 902 is the primary and one transcoder 902 is the backup, and only one 902 is sending streams to the packager. If the primary 902 fails, then the backup chassis 902 will send the streams to the packager.

Using multiple chassis enables additional service configuration flexibility. For example, with multiple chassis there are lesser or no constraints on bounding a service group based on available transcoding resources within a single chassis. Further, multiple chassis allows for additional failover/protection options. Rather, with a service group interleaved across two chassis, if one chassis fails completely, the service group is still available but has half the bitrate options available, thereby incurring no additional cost for redundancy hardware/protection switching.

As described above, the output streams from a transcoder 102 can be of varying bitrates, resolutions and/or frame rates. An adaptive streaming group may be made up of a group of multiple output streams with varying multiple output stream representations. The adaptive streaming group may be made up of output streams from a one or more chassis, one or more transcoders (within one or more chassis), or even more specifically, output from one or more encoders from the same transcoding processor. Thus, depending on the configuration, an adaptive streaming group may include streams that reside within one transcoding processor, multiple transcoding processor or even on multiple chassis with respective transcoding processor(s). Disclosed are techniques for synching the outputs of the transcoding processor or encoders within the transcoding processor prior to delivery to a packager.

Figure 10:
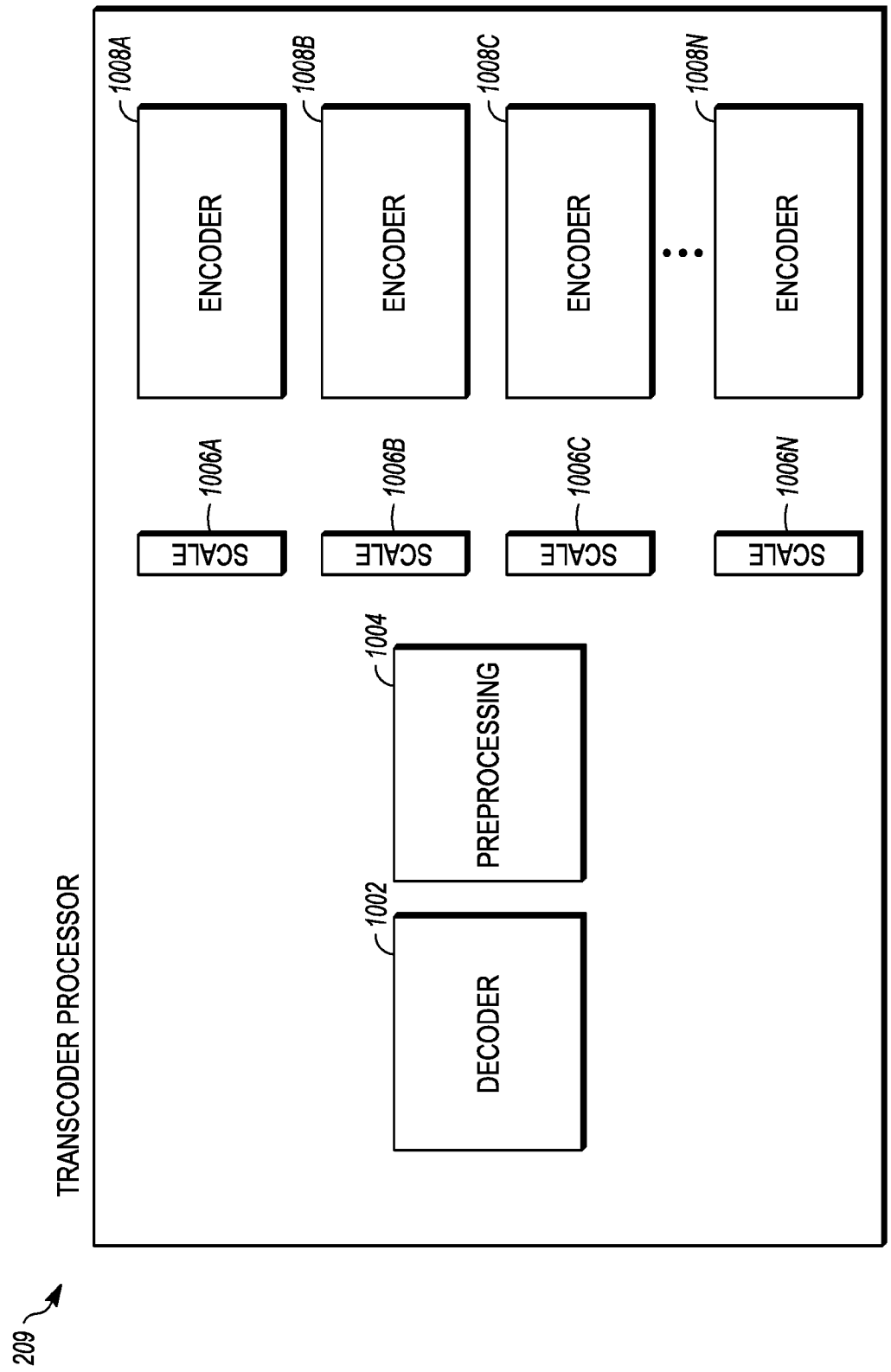
FIG. 10 depicts a transcoding processor for performing the disclosed transcoding processing.

The transcoding processor 209 is shown in FIG. 10 having a decoder 1002, a pre-processor 1004, scaling modules 1006a-n, and encoders 1008a-n, similar to the transcoding processor 209 depicted in FIG. 3 above. As described above, the transcoder may also include a smoothing filter, a demultiplexer, a multiplexer, or other components for assisting in the transcoding process performed by the transcoding processor 209.

The decoder 302 decodes the input to the transcoding module 208. As shown in FIG. 10, each transcoder chip in this example transcoder module performs a transcode via a decoder and four different encoders, enabling four different encodes of the same input media content.

FIG. 10 depicts a single decoder 1002. In implementations, a single decoder is sufficient for a transcoder with four transcoding modules, as shown by the example transcoder 102 in FIG. 2 having XCODER modules. The decoder 1002 receives a compressed input and decodes the input in to pixel by pixel images. The decoder 1002 outputs a decoded stream to a pre-processor. The same pre-processor functionality may be shared by all the encoders 1008a-n on the transcoding processor 209.

In this example, since there is still a single representation of the input, synchronization between streams coming out of the pre-processor 1004 is not necessary. However, it is noted that the disclosed techniques may apply for multiple pre-processors if the transcoder is configured with multiple pre-processors. The pre-processor 1004 is configured to detect frame content. For example, there may be sixty frames in the decoded input with thirty-six duplicates. Pre-processing processes the frames to discard the duplicates to limit wasting resources coding the duplicate frames.

The output from the pre-processor 1004, made up of frames for encoding, may be passed to encoders 1008a-n. The output may first go through a scale 1006a-n prior to entering each encoder for scaling the input to the encoder to a different resolution. All four encoders 1008a-d depicted by way of example in FIG. 10 receive the input from a respective scaler 1006a-d the input, each encoder receiving the same frame(s). Following encoding, the encoders 1008a-n may output a stream for delivery to a subscriber device. Encoders in the transcoder modules may rely on HTTP to work efficiently over large distributed HTTP networks, such as the Internet.

A subscriber device may switch between different encodings made available by the transcoder 102, depending on available resources. In embodiments for implementing single transcoder processor synchronization, there can be multiple output streams that are assigned to the same transcoded ABR output group. Each of these streams may originate from the same input stream having the same input resolution and frame rate, but the output streams can vary in both resolution and frame rate. The subscriber device may detect a user's bandwidth and CPU capacity in real time and adjust the quality of video stream requested accordingly by selecting a different bit rate version of the media content generated by the transcoding module(s). The subscriber device may switch between streams assigned to an ABR output group.

In embodiments for enabling seamless switching between streams in an ABR output group, synchronization of the output streams in the same ABR output group may be required for each output stream to maintain identical segments/fragment boundaries in the output stream, i.e., each segment/fragment of each output stream must begin with an IDR on a frame from the same place in time. To achieve this synchronization, disclosed herein are techniques for maintaining synchronization in three areas in the encoding pipeline: inverse telecine, frame rate conversion, and GOP synchronization.

Described in more detail below are techniques for synchronizing output streams across transcoding processors and across a chassis, i.e., inter-chassis synchronization and/or cross-chassis synchronization. Embodiments are disclosed in which the streams need matching inverse telecine decisions for synchronization. In embodiments, the streams need matching frame rate conversion decisions for synchronization. In embodiments, the streams need matching IDR frame selection for synchronization. Disclosed herein are techniques that describe the three levels of synchronization, alone and in combination. As disclosed, deterministic approaches to detelecine and frame rate conversion are employed to maintain synchronization across multiple transcoders. Historical data comparison mid-segment may be used to verify the synchronization and make corrections mid-segment to ensure the next segment after the mid-segment and those following will remain synchronized.

In embodiments, techniques are disclosed that maintain synchronization for the plurality of encoders without sacrificing video quality. For example, to ensure video quality embodiments may include a master encoder to collect frame statistics (e.g., scene change, film mode, fade, flash, along with other statistics) to determine where to place a segment boundaries for the best video quality (VQ). The use of frame statistics allows for segment adjustment in real time in the master encoder. Since the same statistics would apply in the slave encoders, then passing segment boundaries to the slave encoders enables the slave encoders to also have the best video quality (VQ). An additional technique to move the PTS of a frame around scene change when synchronizing multiple frame rates ensures that we can still preserve a scene change at a segment boundary.

In embodiments for achieving synchronization, a master stream is chosen from the group of output streams. In embodiments, all other output streams are designated as slave streams, and all slave streams will be following the decisions made on the master stream. In embodiments, the master stream is selected as the stream with the highest resolution. Referring back to FIG. 2, for example, the 202a input may then be input to one or more transcoder processors 209a-n. The host chassis may determine based on output frame rate and resolution which of the output streams of the group is determined to be the master. The use of the stream with the highest resolution in the master stream may provide a better VQ for the output than the use of a stream as the master stream that does not have the highest resolution in the group.

The encoder 1008a-n corresponding to the master stream is selected as the master encoder, and will determine where to segment (or chunk) the stream. The designated location for segmenting can be used later downstream for switching between streams from the different encoders. Thus, the master encoder can determine when streams downstream can switch between streams from the different encoders by determining the segment locations. The master encoder determines where in the stream transitions will be possible, designating these as segment, or chunk, boundaries.

The master encoder may evaluate one or more factors to determine when to designate segments in the stream. For example, an IDR frame may be designated as a segmentation point. When switching between streams, an I-frame and IDR-frame are needed. Because IDR frames are expensive, i.e., use significant system resources, to code, but need to be recoded anyway when switching streams, then the IDR frame may be an efficient location for a scene change frame as the chunk boundary. On the other hand, a frame in a fade portion of the stream may not be a desirable location to designate as a chunk boundary because cutting between streams during a fade may cause disruptions to the viewer.

The master encoder provides the information for chunk boundaries to the other encoders, which function as slave encoders to the master encoder. For example, if the master encoder selects frame 196 as a chunk boundary, it instructs the other encoders in the chip to also chunk at that frame 196.

It is noted that providing an algorithm for determining chunk boundaries deep inside the encoder is a unique way to gather information for chunking. In other words, by locating the encoders and slave encoders in the chip within the transcoder, and determining by a master encoder the chunk boundary within the processing of the transcoding processor 209, the master encoder is able to make frame intelligent decisions with the additional information available to it to determine the chunk boundary. For example, the master encoder has statistics about the frames. In contrast to solutions that determine how to handle frames outside the of transcoding processor 209, the disclosed techniques are more frame intelligent. For example, outside of the transcoding processor 209, such as at the time of receipt of an input stream by a chassis, scene information is unavailable for determining a chunk boundary.

A telecine process involves adding additional frames to a picture in order to increase the framerate, is called telecine. In an example scenario involving motion pictures, it is noted that motion pictures are typically captured onto film at a rate of 24 fps, while video frames in a known NTSC format are typically captured and displayed at a rate of 30 fps. In particular, movies are normally shot using 24.00 fps framerate and American TV system, NTSC, uses a framerate of 29.97 fps (30/1.001), which the industry usually rounds to 30p when referencing the 29.97 fps frame rate. Thus, movie framerates need to be changed in order to get them play smoothly on TV. A telecine procedure may be used to convert a frame rate of 24 frames-per-second (fps) to a frame rate of 30 fps.

A process in which various video editing tools reverse the telecine process is called inverse telecine. In inverse telecine, video at x frames/second is converted back to an exact number of y frames/second. Using the example of the telecine process above, the inverse telecine process brings back a movie's original framerate from NTSC's 29.97 fps to 24 fps. Thus, video at 29.97 frames per second (59.94 fields per second) that has gone through the telecine process is reconstructed or converted back to exactly 24.00 frames per second (or substantially close to 24.00, such as inverse telecining NTSC video back to 23.976 frames per second). Note that the industry typically refers to the 59.94 (60/1.001) fields per second value as 60p, rounding up when referencing. Herein, 30p and 60p are used.

Referring back to the transcoder shown in FIG. 3, the inverse telecine process may occur at the pre-processor 1004. Synchronizing the inverse telecine process performed on different output streams in a transcoded output group may be accomplished by passing the inverse telecine comparison results from the master encoder on a Master Output Channel, to each of the other output channels. Then, by using a deterministic algorithm for choosing the repeat frames, each output stream will choose the same repeat fields for the output stream. This may be necessary where inverse telecine in all output streams is not performed on the same resolution. Since it's not the same input frames, this could cause some outputs to have different comparison results.

When each transcoder encodes at a different resolution, there may be different results in inverse telecine detection since each transcoder is operating on different data. This may be a problem since we must have the same encoded frame at each fragment/segment IDR. If inverse telecine between transcoders is different, the IDRs may not have the same content and PTS. Although the images are the same, different resolutions produce different video data. In embodiments, the inverse telecine decisions must match to ensure fragment/segment IDR synchronization, e.g., each transcoder must produce the exact same 24p image at the fragment/segment IDR. Thus, to match the inverse telecine decisions, the master may send the slaves frame statistics used for the inverse telecine decision, whereby using the same statistics by the slaves ensures the same inverse telecine results as the master and each other.

In embodiments for frame rate conversion (FRC) synchronization in the pre-processor, it may be important that every frame rate conversion performed by a group chooses the same frames when converting to lower frame rates. For example, in an example transcoder processor chip design, the frame rate conversion is performed multiple times for each output stream. Using a fully deterministic algorithm in this circumstance, no active synchronization is required for the frame rate conversion.

In an example, the output of a transcoder may be 30p. The input picture rate is typically 60p or 30i (some in the industry say 60i which is the same as 30i). 60p is 60 frames per second, while 30i is 60 fields per second. Field and frames are referred to as pictures. Since the output has ½ the picture rate as the input, ½ of the pictures are dropped, or ever other picture is dropped (or every other picture extracted). When there are multiple transcoders, each drops the same picture so that switching between different transcoded output streams will be seamless. In embodiments, when converting from 30i to 30p, only top frames are kept. For example, the conversion from 30 frames per second interlaced content (aka 30i) to 30 frames per second progressive output is performed by extracting only the top field from the 30i content. This ensures that multiple transcoders extract the same image when converting 30i to 30p.

In certain implementations, the frame rate is converted from 60p to 30p. The difference in PTS between frames in a 60p (59.94p) sequence toggles between 1501 and 1502 90Khz Ticks. (1.001/60)*90000=1501.5. Since PTS has no fractional component, the difference in PTS between sequential frames is 1501, 1502, 1501, 1502, . . . . In embodiments of such conversion from 60p to 30p, only frames with 1501 duration are processed. Thus, the conversion from 60 frames per second interlaced content (aka 60p) to 30 frames per second progressive output is performed by using the frame in which the difference in PTS from the previous frame's PTS is 1501. However, other frame rate conversions do not have these properties like 50 Hz->25 Hz or 30 Hz to 10 Hz, so other synchronization methods are employed to keep them synchronized.

In embodiments, grouping is performed for synchronizing the frame rate conversion. The transcoding module places all of the outputs with the same frame rate on the same frame rate conversion module, so the conversion to that frame rate is only done once. The resulting frames are then passed to all of the downstream encoders. The transcoding chip can support up to 4 outputs from the same frame rate conversion module. Thus, often all of the outputs for these lower frame rates (especially the 10 Hz and 15 Hz rates) can be supported by the same frame rate conversion module. Thus, by using the same frame rate conversion, the outputs will stay in sync for frame rate conversion.

In embodiments, active resynchronization techniques may be employed. It may be desirable to actively synchronize more than one frame rate conversion module; in some cases it is necessary to synchronize the modules. For instance, synchronizing the frame rate conversion modules may be necessary when there are four (4) 1280×720p25 outputs in a group, as one frame rate conversion module may not be capable of processing more than two (2) 1280×720p25 output channels. During active synchronization, the slave channels are constantly comparing the PTS values of the slave channel, with the PTS values of the master output channel. When a mismatch is detected, the slave channels will drop an extra frame in the frame rate conversion, bringing the channel back in sync with the master. The frame drop resynchronization may be done multiple times to bring a slave channel back in sync with the master channel. For example, in the case of 30 Hz to 10 Hz, for example, the frame drop resynchronization may need to be done two times in order to bring the channel back in sync with the master. In some designs, once the two channels are synchronized, they may remain synchronized because there is no any variance in the input channel within a transcoding processor 209.

In embodiments for converting 25i (aka 50i) to 25p, the top field is pulled, just like the 30i to 30p case described above. For 50p to 25p, the difference in PTS between frames is constant, so there is no way to consistently pick the same frame in multiple transcoders. In this case, the master transcoder may start with one 50p frame and select ever other subsequent 50p frame for the 25p output. The slave transcoders perform the same process, but may select the wrong frame such that the 25p of the slave does not match the master. To solve this, the master signals the slave transcoder which frame was chosen and if the slave is wrong, the slave transcoder will skip a 50p frame to then select the correct 50p frame for its 25p output.

In some implementations, it is necessary that each segment/fragment boundary on the output streams remain synchronized. In implementations it is necessary that each stream mark its segment/fragment boundary, place an IDR on the first frame after the boundary, and ensure that the frame in the output stream matches in PTS (and time) the frame from the master output channel. In general, a setup configuration will provide a range for placing these boundary points in the output stream. The disclosed techniques may then include placing the fragment and segment boundaries in locations that provide for the best video quality. Note that the larger these ranges are, the better the opportunity may be for the transcoding processor 209 to place the segment/fragment boundaries in a location that has little or no adverse effect on the video quality.

Fragment boundaries may be selected based on user parameters. For example, a user may select a fragment size in units of fraction of seconds (1.5 seconds for example) with a range such as 0.5 to 2.0 seconds or fixed at 1.5 seconds with no range. In embodiments, the preferred fragment boundary placement is at a scene change, the end of a fade, or end of pan. If the fragment were not moved at these boundaries, then there would be an IDR at the fragment with a possible I frame or heavily Intra coded B or P frame close to the fragment IDR. Two frames close together that are intra coded can cause poor video quality since those frames consume the most bandwidth.

Disclosed herein are techniques to close the GOP. If the fragment is equal to the MaxFragmentSize (where MaxFragmentSize is the maximum number of frames since the previous fragment allowed that meets the user set maximum fragment interval), the fragment IDR may be inserted. If we are not at the MaxFragmentSize, the transcoder may look ahead for a scene change, the end of a fade, or the end of pan in the fragment range. If there is a such an event in the fragment range, then that frame will be the new fragment IDR boundary.

An example of rules that may be followed for frame rate synchronization include:
1. If there is a Scene Change within the boundary range, the first frame of the new scene will be promoted to an IDR and that picture will be the first frame of the new segment/fragment.
2. When there is no scene change in the boundary range, the I frame that falls closest to the nominal boundary will be promoted to an IDR and become the first frame of the new segment/fragment.

Note that during steady state, the segment/fragment size may not always be the same. Although the GOP size may be set to 32 in examples described, the GOP size may vary due to camera flashes, fades and scene changes that fall outside the boundary range. The variations can affect the GOP size which in turn effects the placement of the natural I frames. Therefore, the segment/fragment sizes may vary.

It is noted that as used herein, segments may be defined as the segment set at every n fragment boundary, where "n" may be variable since the segment boundary may be defined as the maximum time between segments. Each time a fragment is inserted, the system determines if that fragment will be a segment as well. Because in the present it may be unknown when the next fragment will occur, a conservative approach disclosed herein is to issue a segment based on the worst case (maximum) fragment size, making an assumption that the next fragment will occur at the maximum fragment size. An example algorithm for capturing such technique is shown below:

If ((SegmentPicCnt+MaxFragmentSize)>SegmentSize), then make this Fragment a Segment as well.

Where SegmentPicCnt is the number of frames since the last Segment boundary:
MaxFragmentSize is the longest fragment size set by the user
SegmentSize is the longest Segment size by the user.

In embodiments using the algorithm above, the segments/fragments are determined ahead of the GOP selection code that is based on other factors such as scene change, motion, fades, flashes, and other special events. If the GOP selection code sets the current frame as an IDR and if the next frame is our fragment IDR, then the algorithm sets the current frame as the fragment/segment boundary as long as it does not violate the minimum fragment size. Then the next frame will not be forced as IDR. This again avoids having two intra coded frames in a row with may cause poor video quality.

In embodiments that involve mixing output frame rates in an ABR group, the fragment or segment IDR must fall on the same frame with the same PTS in both outputs. For example, when mixing 30p and 60p output frame rates in an ABR group, the fragment or segment IDR must fall on the same frame with the same PTS in both the 60p and 30p outputs. The 30p output contains every other frame of the 60p output. This is challenging when there is a scene change or ad insert signal (from SCTE-35 splice point message) that falls on a frame that exists in 60p but would be skipped in the 30p output.

Disclosed herein are embodiments for mixing frame rates such that the fragment or segment IDR occurs on the same frame with the same PTS in both outputs. Three embodiments are disclosed below using an example of mixing 30p and 60p output frame rates in an ABR group, but it should be understood that mixing other output frame rates may employ similar or the same techniques, such as mixing 25p and 50p output frame rates (although the PTS differences between frames may vary depending on the output frame rates that are mixed, e.g., PTS differences between 25p and 50p may not be the same as the 30p/60p mixing example).

In an example of frame rate conversion and mixing frame rates, the master encoder may determine a frame in the master encoder output representation stream in which a scene change is located that will be skipped when converting the output frame rate of the stream from a first output frame rate to a second output frame rate. The second output frame rate causes an increase in a number of frames in the output stream representation to achieve the first output frame rate. To address the skipped frame holding the scene change, the master encoder sets a PTS at a fragment boundary on the output stream representation at the first output frame rate to match a PTS at a fragment boundary of the output stream representation at the second output frame rate, thereby signaling a single frame instead of the increased number of frames on a previous frame.

In an example, the second output rate may cause the output stream representation to be frame doubled or frame tripled to achieve the first output frame rate. In accordance with the above, the master encoder may signal a single frame on the previous frame instead of signaling frame doubling or frame tripling, respectively. In an example scenario when mixing frame rates, the 30p output runs in frame doubling mode in which each frame is signaled to be displayed twice. The signaling of each frame to be displayed twice in a frame doubline mode is per an MPEG syntax, which also details a frame tripling mode in which each frame is signaled to be displayed three times. It should be understood that other modes are covered by the disclosed concepts, e.g., quadrupling, etc. Although the frames are encoded at 30 frames per second, the frame doubling message in each frame causes the 30p to be displayed at 60p. The display at 60p may prevent a jittery output, displaying film content in a smoother manner when converting film from its native 24p to 30p.

In the above scenario, consider when a scene change falls on 60p, but due to the 30p transcode the frame is skipped. For this case in the 30p transcode, embodiment are disclosed for skipping the signaling frame doubling on the previous frame and signal a single frame instead. The PTS at the fragment/segment boundary on the 30p stream is set to match the PTS at the fragment/segment boundary of the 60p stream. Then, 30p frame at the 30p boundary is signaled with frame tripling. In embodiments, in addition to the signaling changes, the actual scene change frame may be used, even though it would have been skipped and the following frame would be used as the scene change frame.

In embodiments for mixing frame rates, if frame doubling mode is not used in the 30p output, the PTS on the 30p stream may be moved to match the DR on the 60p. Moving the PTS on the 30p stream may cause the delta PTS between the fragment/segment IDR frame and the previous frame to be 1501 and the delta PTS between the fragment/segment IDR frame and next frame to be 4502. Note that when there is no such special case, the difference in PTS between 30p frames is 3003.

In embodiments for mixing frame rates, the fragment/segment may be moved as far away from the scene change as allowed by the fragment/segment range. Moving the fragment/segment in such manner may avoid forcing the DR in a specific frame. Thus, the scene change may be coded as an I on the 50p and 25p sequences on different frames. Such scene change coding may be acceptable for ABR requiring that the pictures match content and PTS at the fragment/segment IDRs. Moving the IDR away from the scene change may prevent the IDR and I frame to occur close together since I and IDR frames consume the most bits. For SCTE-35 messages in which the IDR cannot be moved, video quality may be poor.

In embodiments for a GOP synch, when synchronizing the output streams into segments and fragments, each output stream may be configured to follow the same GOP Structure. In embodiments, the best video quality is achieved on all output streams when the GOP and subGOP structures are in line. By employing the disclosed techniques, the optimizations performed on the master channel to place the IDR at an optimal video quality location may be translated to the slave output streams.

Some adaptive streaming groups may have more output representations than can be contained within one transcoding processor or chip 209. In this case, the output representations may span multiple transcoding processors 209. Multiple transcoding processors may go out of synch due to various sources. For example, varying noise observed and effecting transcoding differently across transcoders, or decoders across transcoding processors 209 may go out of synch (e.g., a first decoder may have corruption in its input, drop frames, using different decoding resources and outputs).

In order to complete the synchronization, each transcoding processor 209 in a chassis can communicate through the PCIE bus. Within a multichip output group, there is one master chip (with one master output stream) and the remaining chips are designated as slave chips. The transcoding processor or chip (master stream) will push synchronization information to each of the slave transcoding processors. Although the bus may be bi-directional, there may not be return communication from the slaves to keep the protocol simple. The master transcoding processor/stream can pass the frame rate conversion synchronization, fragment/segment boundary Synchronization, and GOP synchronization information to the slave transcoding processors.

Because of the latency differences between chassis, synching between encoders as described above may not be timely for synching between output streams (e.g., where there is a long distance between chassis locations, such as a chassis in Canada and a chassis in New York). Embodiments for chassis-to-chassis synchronization may be implemented when a group of output channels to be synchronized span across multiple chassis. Embodiments are disclosed in which one chassis is identified as the primary chassis, and the remaining chassis are identified as secondary chassis. The embodiments are described with respect to a redundancy IDR sync and a redundancy picture level sync.

With redundancy IDR sync, there is flexibility on the delay of communication between the chassis and delay in the input to the chassis. A master stream is identified on each chassis that has the same output resolution and frame rate.

In examples described, the delay cannot exceed two seconds; however, the algorithms disclosed apply to variable levels of delay.

If there is no common output stream with the same output resolution and frame rate on each chassis, then a redundancy picture level synch may be implemented. For redundancy picture level sync, the combined delay between the communication and the input must be less than a threshold value due to the end-to-end delay through the transcoding processor. In embodiments, the threshold value is defined at 300 ms.

The algorithm for redundancy IDR Sync is such that the frame rate conversion, segmentation, fragmentation, and GOP structure decisions described above are deterministic such that once synchronization is achieved, the output streams may remain in sync over time for the duration that they are provided an identical input signal. In embodiments during IDR Synchronization, a database of picture based metadata is transferred from the master chassis to each of the secondary, or slave, chassis. The database includes (but is not limited to) the following information for each frame:
  PTS
  Picture Type—IDR, I, P, Bref or B
  Segment Cnt—The picture count since the beginning of the segment
  GOP Count—The current GOP count
  Poc—The picture order count In addition, an identical database may be maintained for the encoded streams on the slave chassis.

The master chassis can be either ahead or behind the slave chassis due to a lack of input synchronization to the multiple Chassis. The master chassis can also be ahead or behind the slave chassis due to the database arrival to the slave chassis, which may be delivered with various delays. Therefore, synchronization may be desirable for both a slave chassis that is running behind the master, and/or a slave chassis that is running ahead of the master.

When the master synchronization is ahead of the slave, then the slave is able to look up master data for the current frame being encoded.

When the slave chassis is ahead of the master chassis, instead of the slave synchronizing the current frame, it may instead check historical data to verify synchronization with the last frame received from the master chassis. For example, the slave chassis may examine the last frame data received from the master chassis, and then search back through the slave chassis historical recording to find the corresponding frame. The slave chassis can then verify that the PTS, IDR/non IDR, Segment count, GOP Count, and POC match for that picture. If they do not match, a resynchronization process can be initiated.

Generally, once two chassis are in sync, they will not go out of sync as we use deterministic algorithms for detelecine, frame rate conversion, GOP structure and chunk boundaries. However, if there is any input signal integrity issues that do not match between each chassis input, then it is possible for the two chassis to diverge. Once this is detected, the slave chassis can compute the GOP count and/or segment count offset between the identical pictures between the master chassis data and the slave chassis data. The offset can be applied to the current state for the picture being encoded.

If the chassis-to-chassis synchronization method implemented is using picture level synchronization, the chassis follow the same synchronization as cross-transcoding processor chip synchronization. In embodiments, all streams on the secondary chassis will be slave streams and will have full synchronization data pushed from the master chassis to the secondary chassis.

It is noted that the algorithms for chassis-to-chassis synchronization may be less accurate and slower to recover in certain scenarios, but a clean signal is the tradeoff, enabling switching between output stream representations based on synchronized, identical frame outputs.

In the context of multi frame rate output synch, it is noted that during film content, sync is generally natural due to both streams outputting the same frames with the same PTS. However, wrapping a 30 Hz stream into a 60 Hz MPEG stream may include marking frames as FRAME_ DOUBLE when they are not in film content. Thus, while wrapping is generally done for film content timing, a scene change (e.g., SCTE-35 cue) that sits on a frame that is not in the 30 Hz stream, or in the nonfilm content, may be used for syncing. The last frame of the previous fragment to the PS_FRAME (instead of PS_FRAME_DOUBLE) may be changed, the first frame of the new segment may be changed to PS_FRAME_TRIPLE, and the first frame of the new segment from the 60p stream may be set as the PTS. In this manner, the sync is seamless and remains a legal stream according to common specifications.

Figure 11:
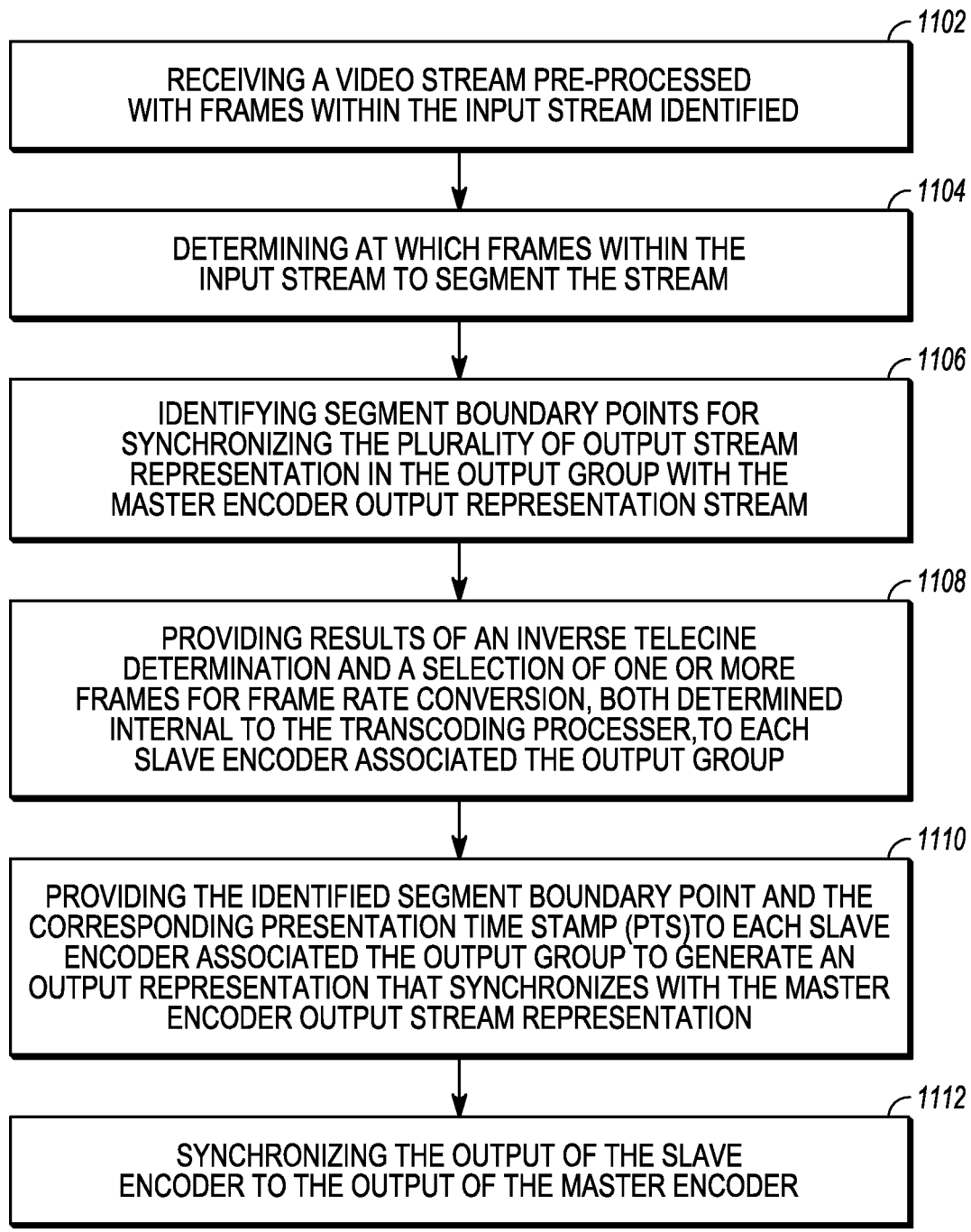
FIG. 11 depicts a flow diagram for synchronizing multiple stream representations in an output group.

FIG. 11 depicts a flow diagram for synchronizing multiple stream representations in an output group. As disclosed herein, a transcoder may include an input for receiving an input stream, a switch coupling the input to one or more transcoding modules, and each of the one or more transcoding modules hosting a plurality of transcoding processors. The transcoding processors may include a master encoder designated to facilitate the synchronization of video outputs across output groups. The remaining encoders associated with the output group may be designated as slave encoders.

An output group may be made up of a plurality of stream representations generated from a single stream input to the transcoder, such as the outputs from one or more of the transcoding processors hosted on a single transcoder. An output group may be made up of a plurality of stream representations generated from corresponding input streams input to a plurality of transcoders. For example, a single chassis may include multiple transcoders, each with their own plurality of transcoding processors. In another example, more than one chassis may host one or more transcoders each with their own plurality of transcoding processors. Thus, an output group may span multiple transcoding processors, multiple transcoders, or even multiple chassis.

The transcoding processors associated with the output group may be comprised of a plurality of encoders for outputting stream representation associated with the same input stream, wherein at least one of the plurality of encoders in the output group is designated as a master encoder. The encoder designated as the master encoder may receive an output from a decoder internal to the transcoding processor that has been processed by a pre-processor. The pre-processing may occur by a pre-processor internal to the transcoding processor for receiving the decoded stream from the decoder, detecting frame content, and outputting a stream with frames identified for encoding.

At 1102, the master encoder may receive the pre-processed video stream with frames within the input stream identified and, based on the pre-processed information, the master encoder may determine at 1104 which frames within the input stream to segment the stream. Based on the segmentation, the master encoder at 1106 may identify segment boundary points for synchronizing the plurality of output stream representations in the output group with the master encoder output representation stream.

On the stream input to the master encoder, the master encoder may make inverse telecine decisions and select one or more frames for frame rate conversion. Instead of the slave encoders performing similar processing, the master encoder may, at 1108, provide the results of an inverse telecine determination and a selection of one or more frames for frame rate conversion, both determined internal to the transcoding processor, to each slave encoder associated the output group. Further, the master encoder at 1110 may provide the identified segment boundary points and the corresponding presentation time stamp (PTS) to each slave encoder associated the output group to generate an output representation that synchronizes with the master encoder output stream representation. The slave encoders at 1112 may synchronize their outputs with those of the master encoder by using the decisions of the master encoder.

Figure 12:
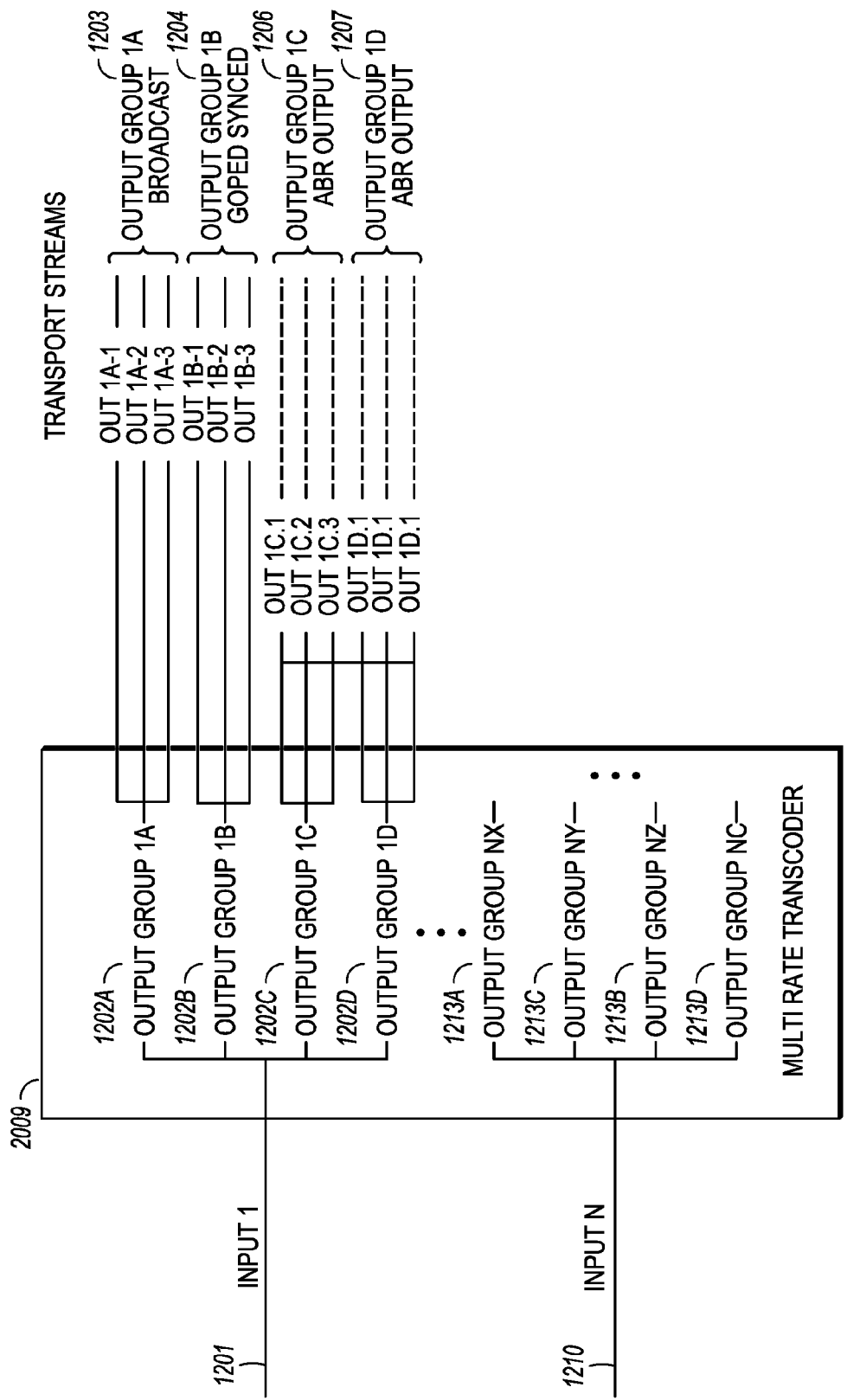
FIG. 12 depicts an example multi-bitrate transcoder for synchronizing transcoded audio output transport streams between multiple transcoder units.

FIG. 12 depicts an example multi-bitrate transcoder 102 for synchronizing transcoded audio output transport streams between two transcoder units. The techniques apply for synchronizing output stream audio across transcoding processors 209 in the transcoding module and across chassis.

An example of a scenario in which synching across transcoding chips 209 or across chassis may be desirable is when a channel resides in two locations with streams split between the two locations, which is often the case for redundancy. In the case of externally managed chassis redundancy, the transcoder provides an interface for configuration and control of redundancy role and switch over. For example, the transcoder may provide a Simple Network Management Protocol (SNMP) interface for managing devices on IP networks. An autonomous redundancy on the chassis, the GbE interface and the input service may be provided by the transcoder management software. In the following discussion, these 3 levels of redundancy, e.g. chassis, GbE interface and input service are referred generally as redundancy.

The disclosed transcoding processor audio inter-chassis IDR synchronization techniques synchronize unaligned audio transport stream outputs such that the audio is synchronized around the video IDR frame boundaries. The streams synchronized may be those that have been ingested by the transcoder in a compressed format and transcoded into a different compressed format, as described herein as part of the transcoding process. Embodiments are disclosed for synchronizing output streams such that audio frame boundaries contain identical pulse-code modulation (PCM) samples, packetized elementary stream (PES) location, and presentation time stamp (PTS) value. At the audio frame boundaries, audio packets that have identical PCM sample, PES location, and/or PTS value may enable the client device to seamlessly switch between streams, including switching between audio outputs with different bitrates. Further disclosed herein are embodiments for audio inter-chassis IDR synchronization design in a multi-rate transcoder system.

FIG. 12 depicts the multirate transcoder 102 configured for an audio inter-chassis IDR synchronization. The audio inter-chassis IDR synchronization includes synchronizing the transcoded audio output transport streams between at least two transcoder chassis, at least one primary transcoder chassis and one or more secondary chassis. The audio sources at the primary transcoder system can be either ahead or behind the source at the one or more secondary transcoder systems. The techniques disclosed herein support synchronization of audio output streams with different audio output bitrates. FIG. 12 represents an example of input stream to output stream scaling in a typical multi-bitrates transcoder.

FIG. 12 illustrates input streams 1201 and 1210 input to the multi-bitrate transcoder 102, where one or more output streams may result from each respective input stream, and output groups may comprise multiple of the output streams. Each input stream 1201, 1210, to the multirate transcoder 102 may be a single program transport stream (SPTS) that includes encoded/compressed video and audio. A transcoder system may be configured to take a multi-program input transport stream and transcode it into multiple output streams. The output groups can be configured for broadcast, GOP/IDR Synced, and Adaptive Bitrate Outputs.

As shown by the example in FIG. 12, input 1 1201 has been configured to generate four output groups 1203, 1204, 1206, 1207. The output transport streams that make up the output groups 1203, 1204, 1206, 1207 shown in the example in FIG. 12 may be broadcast, GOP/IDR outputs, or adaptive bit rate outputs. Thus, one input transport stream can have multiple output groups, where an output group is the transcoded output stream(s) having video, audio, and data. An output group may include more than one MPT S.

More specifically, output group 1A 1203 in FIG. 12 includes three output streams used for broadcast service (e.g. no GOP/IDR alignment requirement). The output group 1B 1204 includes three output streams that are required to be GOP/IDR synced. The output group 1C 1206 shares a same output streams requirement, but the streams have been further segmented by an embedded packager. The output group 1D 1207 includes three output streams required to be GOP/IDR synced and ABR segmented. It should be understood that each output stream group is depicted for purposes of example, and an output stream group may comprise any number of output streams generated based on the single input stream and have respective requirements for synching between streams.

In embodiments, the audio PTS and corresponding data for each output transport stream of an adaptive bitrate transport stream group 1206 is matched at each segment/fragment boundary. Thus, each segment/fragment begins with an IDR on a frame from the same place in time, which in turn enables the client device to seamlessly switch between streams in the output group.

When an output group is configured for GOP/IDR sync, such as output group 1204, the group in the primary transcoder system can be paired with the corresponding GOP/IDR synced output group in the secondary transcoder system. Thus, the output group in the secondary transcoder system can function as a backup to the master transcoder system. In addition, the audio output in the secondary output group can be configured to have different audio output bitrates than the primary output group.

In embodiments for performing redundancy, the selected input transport stream for both the primary and secondary GOP/IDR synced groups must contain the same audio content such that the input rate and audio type (AC3, AAC, and etc.) are identical. The audio source at the secondary transcoder system can be either ahead or behind the source at the primary, or master, transcoder system. In addition, the audio transport stream outputs for both the primary and secondary GOP/IDR synced groups must be configured with the same audio output type in order to ensure that the output frame duration is the same. The audio output rates can be different. For example, the primary transcoding processor can have output group 1B 1204 audio configuration as stream 1B-1 (AAC 128 Kbps), stream 1B-2 (AC3 256 kbps), and stream 1B-3 (HE-AAC 64 kbps). The secondary transcoding processor may have output group 1B audio configuration as 1B-1 (AAC 96 Kbps), 1B-2 (AC3 320 Kbps), and 1B-3 (HE-AAC 112 Kbps).

When configured, the transcoder may perform the job of making sure an IDR frame is present at a segment boundary, and passes this boundary info as embedded metadata inside the media content, such as a transport stream, e.g., MPEG-2 TS.

Figure 13:
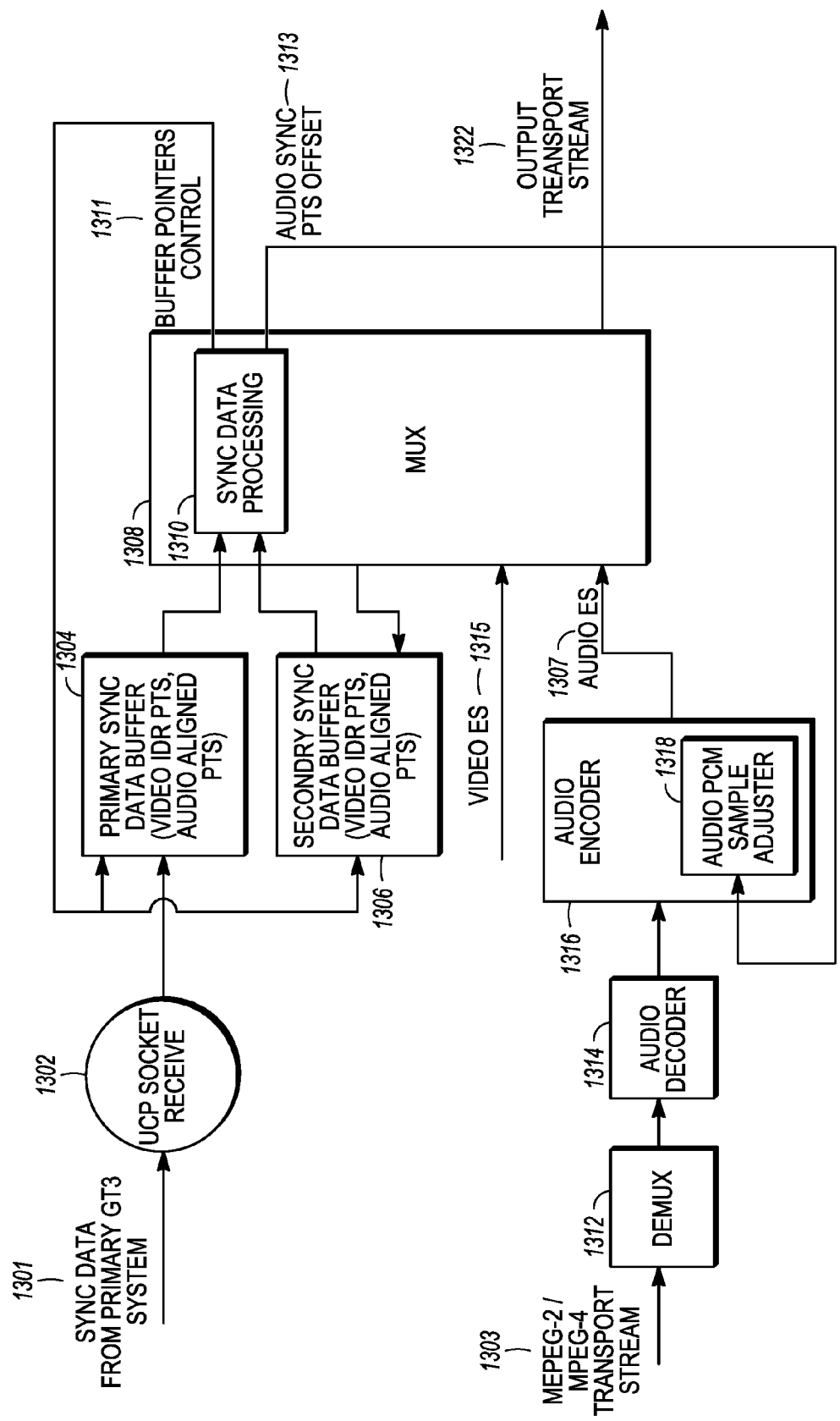
FIG. 13 depicts an example of audio inter-chassis IDR synchronization.

FIG. 13 depicts an example of the audio inter-chassis IDR synchronization described above. FIG. 12 depicts an embodiment for performing audio inter-chassis IDR synchronization, such as on a transcoding processor 209 in the transcoding module 208. As described below, the transcoded audio outputs of paired GOP/IDR synced groups from a primary and at least one secondary transcoder systems may be synchronized using the audio inter-chassis IDR synchronization algorithm. Synchronization may be maintained in the secondary transcoder system at the audio PES aligned transport packets (also called the synchronization point) which are inserted around a video IDR frame. At the synchronization point, the secondary transcoding system's transcoding processor may check for and adjust when necessary the audio frame boundaries in order to ensure that the audio sync point contains audio transport packets that start on an identical PCM sample, PES location, and PTS value FIG. 13 depicts the functionality that may occur on a secondary transcoder, e.g., a secondary unit employed for additional processing resources or employed as a back-up to the master/primary chassis for redundancy. The techniques in the secondary transcoding unit may be performed in a chassis in a second, remote location from the primary chassis. The functionality depicted in FIG. 13 may be performed by a transcoding processor in a transcoding module in a transcoder, for example. The transcoder is part of the transcoder system, and the transcoder processor may be a chip or on a board that is plugged into the transcoder system. The transcoding functionality is typically found at the headend of a media content distribution system.

The primary transcoder on the primary chassis may create primary information and then pass it to the secondary sync data buffer. The primary transcoding processor's sync data is then transferred to the secondary transcoding processor via messaging by an external Host Processor. As shown in FIG. 13, sync data from a primary transcoder system 1301 is received at the secondary transcoding unit, e.g., at a socket 1302. A socket, e.g., a UDP socket, is a mechanism that may be used by operating systems to give programs access to the network, allowing data to be sent and received between applications on different network machines. The socket may be configured according to a particular protocol, such as UDP. The information 1301 represents the primary information received from the primary unit.

The primary sync data buffer 1304 stores incoming info from the primary unit, such as video IDR PTS and corresponding audio aligned PTS. The secondary transcoding processor is configured to handle the primary's GOP/IDR synced group (also known as the primary transcoding processor's group), and store each audio PES aligned PTS with the corresponding video IDR PTS to a local primary sync data buffer 1304. The PTS pair information (e.g., vidIdrPts and audPts) is stored for each audio stream.

To buffer the video IDR PTS and audio aligned PTS and also track the primary information to the secondary information (video IDR PTS and audio aligned PTS), the Secondary transcoding processor stores its own Video IDR PTS and Audio Aligned PTS information in the secondary sync data buffer 1306.

The secondary processor is configured to handle the secondary's GOP/IDR synced group (also known as the secondary transcoding processor's group) by synchronizing its transcoded audio output to that of the primary transcoding processor by comparing the primary transcoding processor's sync data with its own sync data. The secondary transcoding processor includes a sync data processing module 1310 as shown in FIG. 13 for comparing the primary information, from the primary sync data buffer 1304, to the secondary information, from the secondary sync data buffer 1306, to determine the synch, including the audio synch state.

As part of the sync data processing, the secondary transcoding processor may first search for a primary video IDR PTS that matches the secondary transcoding processor's current video IDR PTS at the MUX input. After identifying a matching primary video IDR PTS, the secondary transcoding processor can compare the corresponding audio PES aligned PTS received from the primary transcoder with a local audio PES aligned PTS. The PTS difference is referred to herein as an audio sync PTS offset. Below embodiments are described for a scenario in which the secondary chassis is behind the primary, the secondary group's audio is behind the primary, or when the secondary is ahead.

FIG. 13 includes a demultiplexer, or demux, 1312, receives the input, such as an MPEG-2 or MPEG-4 transport stream. As an example, the input to the demux may be from the GbE interfaces shown in FIG. 2. The input to the demux 1312 is the input going into both a primary chassis and one or more secondary chassis. The audio decoder 1314 decodes the audio to generate audio PCM samples 1305 for providing to the audio encoder 1316.

When the secondary group's audio is behind that of the primary group's audio, the secondary transcoding processor takes the calculated audio sync PTS offset transmitted via path 1313 to adjust the audio PES aligned PTS at the input of the audio encoder 1316. For example, the audio sync PTS offset is converted to number of PCM samples in the Audio Encoder and used by the Audio PCM sample adjuster. Thus, the PTS is adjusted at the audio PCM sample adjuster 1318 by dropping PCM samples at the audio PCM sample adjuster 1318.

If the secondary chassis is ahead, the sync data processing module 1310 outputs to the buffer pointers control path 1311. The buffer pointers control path 1311 adjusts the buffer to wait until the secondary chassis has synced to the primary chassis. Thus, the sync data processing at 1310 coordinates with the multiplexer of the transcoder. The MUX receives at the input the video elementary stream and audio ES.

Thus, an adjustment at the encoder in the secondary chassis may be performed whenever it is detected that the audio at the secondary chassis is not synchronized to the primary chassis around a Video IDR frame. Once audio synchronization is established, the audio output transport streams remain synchronized as long as the input signals to the chassis contain the same audio content.

Once audio synchronization is established using the disclosed techniques, the paired group's audio output transport stream may remain synchronized as long as the input signal contains the same audio content. It is noted that synchronizing IP packets inter-chassis does not correspond to certain specifications (e.g., CableLabs or DASH specifications) required for proper audio/video sync in ABR systems. The disclosed techniques enable a product to scale across chassis, which is desirable for numerous implementations.

Referring back to FIGS. 1-3, described are physical characteristics of an example transcoder that may be used to employ the disclosed techniques. This section provides specification on the physical characteristics of an example transcoder that may employ the disclosed techniques. The transcoder 102 may be housed in a 1 RU height module. The chassis design may accommodate up to four plug-in hardware modules (boards).

An example transcoding module is an XCODER board, which is configured to provide input to a multi-rate output transcoder. An XCODER board can host six DSP chips and supports at least three high definition (HD) input transcoder service channels. The number of boards installed may be dictated by the maximum number of transcoder service channel required by the transcoder, such as a requirement of 3, 6, 9 or 12 service channels. XCODER boards are hot-swappable from front. The locations in the chassis may be labeled.

By way of example, the media content received by a transcoder is a transport stream, such as an SD H.264/MPEG-2 TS, an HD H.264/MPEG-2 TS, a SD H.264/MPEG-4 TS, or HD H.264/MPEG-4 TS. The received input streams may have varying resolutions, such as 1080i/29.97, 720p/59.94, 480i/29.97, 576i25, 720p/50, 1080i25, 1080p24, 1080p29.97, 1080p59.94, and 1080p50. The audio may be encoded in a variety of formats, such as MP 1-L2, AC-3 (Dolby Digital), or E-AC-3. The received transport streams may contain second audio stream, which may or may not be in the same audio format as the primary audio is.

In embodiments, boundary points may be explicitly signaled with each applicable video access unit. The boundary points may be implicitly signaled for audio and data streams (i.e., not signaled but associated with a video boundary point frame/structure, e.g., EBP).

Figure 14:
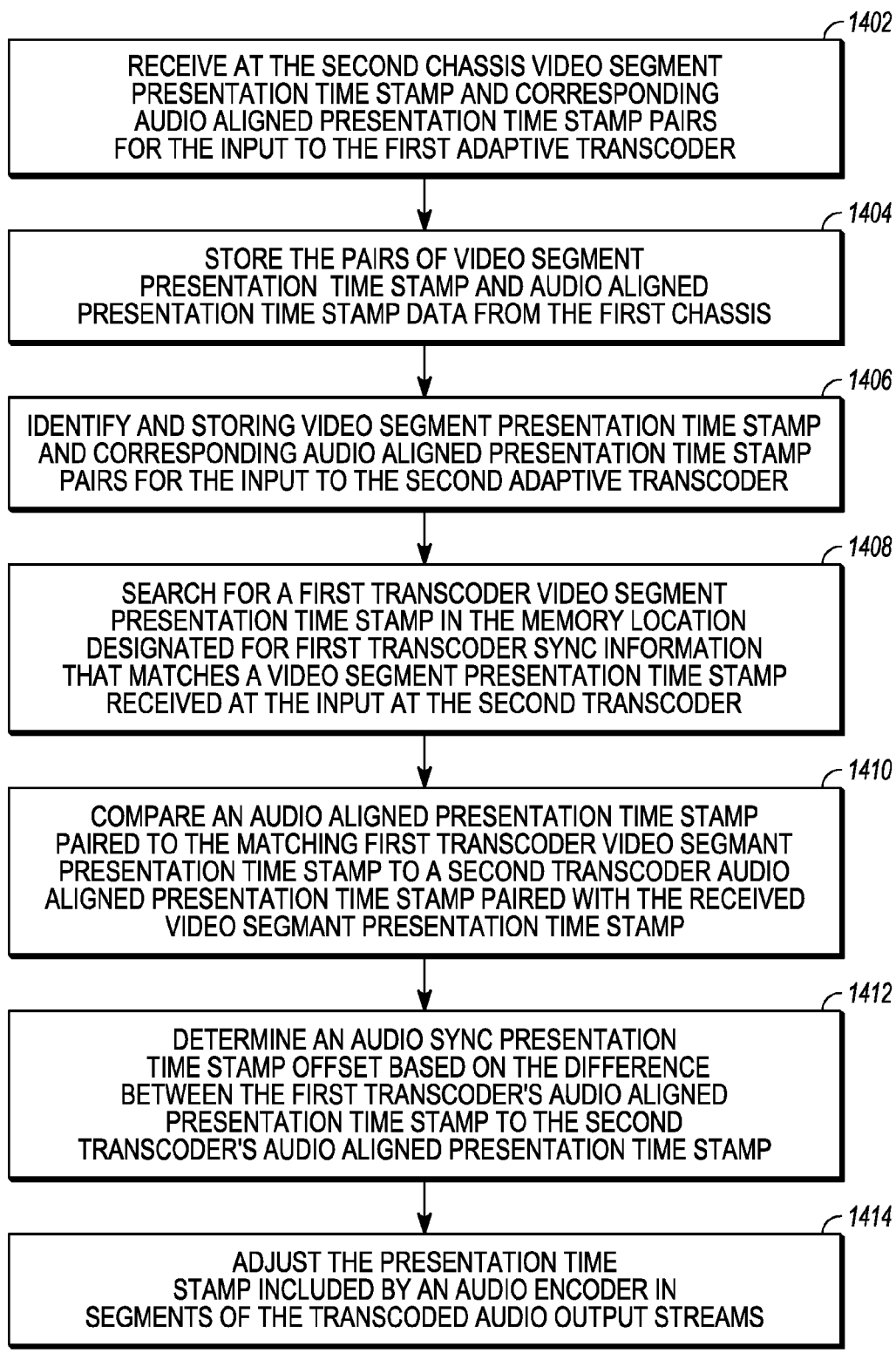
FIG. 14 depicts a flow diagram for inter-chassis synchronization of a group of transcoded audio output transport streams.

FIG. 14 depicts a flow diagram for inter-chassis synchronization of a group of transcoded audio output transport streams at a second chassis with a group of transcoded audio output transport streams at a first chassis. As described herein, inter-chassis synchronization of audio may occur between a first adaptive transcoder in a first chassis and a second adaptive transcoder in a second chassis. The transcoders may have one or more transcoding processors for generating multiple transcoded audio output streams from an input to the first adaptive transcoder, and synchronize the multiple transcoded audio output streams based on corresponding segments. Each transcoding processor may include an audio encoder for inserting presentation time stamps in the segments of the transcoded audio output streams.

A first transcoder may be referred to as a primary transcoder or be hosted by a primary chassis. One or more additional transcoders may be referred to as secondary transcoders, or transcoders hosted by a respective secondary chassis. The secondary transcoders may receive inputs having audio content matching audio content in the input to primary transcoder. The audio outputs from the second transcoders are to be synched to the outputs from the first transcoder (i.e., the primary chassis outputs streams and the secondary chassis sync to the outputs of the primary chassis). FIG. 14 illustrates a manner for the second chassis to synchronize a second group of transcoded audio output streams output from the second transcoder with a first group of transcoded audio output streams output from the first transcoder.

At 1402, the secondary chassis receives video segment presentation time stamp and corresponding audio aligned presentation time stamp pairs for the input to the first adaptive transcoder. At 1404, the secondary chassis stores the pairs of video segment presentation time stamp and audio aligned presentation time stamp data from the first chassis to a memory location in the second chassis designated for first transcoder sync information.

Similarly, the secondary chassis also identifies and stores, at 1406, video segment presentation time stamp and corresponding audio aligned presentation time stamp pairs for the input to the second adaptive transcoder to a memory location in the second chassis designated for second transcoder sync information. In response to the receipt of a video segment presentation time stamp received at the input to the second transcoder, at 1408 the secondary chassis may search for a first transcoder video segment presentation time stamp in the memory location designated for first transcoder sync information that matches the video segment presentation time stamp received at the input at the second transcoder.

Following a comparison at 1410 of an audio aligned presentation time stamp paired to a matching first transcoder video segment presentation time stamp to a second transcoder audio aligned presentation time stamp paired with the received video segment presentation time stamp, the secondary chassis may determine, at 1412, an audio sync presentation time stamp offset based on the difference between the first transcoder's audio aligned presentation time stamp to the second transcoder's audio aligned presentation time stamp. The secondary chassis may then use the audio sync presentation time stamp offset at 1414 to adjust the presentation time stamp inserted by the audio encoder in segments of the transcoded audio output streams to synchronize the transcoded audio output streams output from the second transcoder with the transcoded audio output streams output from the first transcoder.

Figure 15:
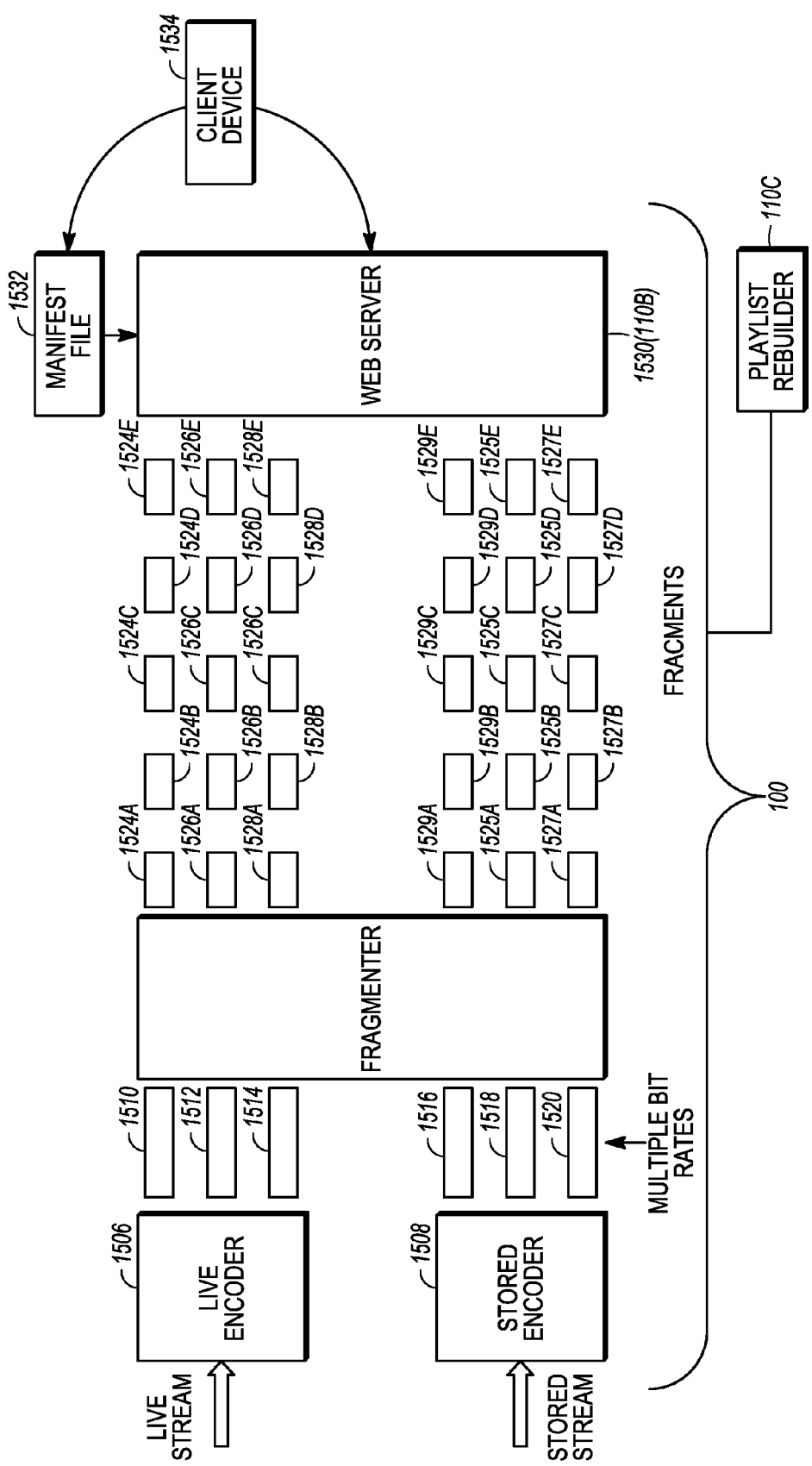
FIG. 15 illustrates components for implementing adaptive bit rate streaming that can be used with the disclosed techniques.

FIG. 15 illustrates components for implementing adaptive bit rate streaming that can be used with the disclosed techniques. A packager 1500 includes an encoder 1506 or 1508, a fragmenter 1522, and a web server 1530 (e.g., HTTP streaming server). The packager 1500 outputs a manifest file 1532 for adaptive bit rate metadata. The adaptive bit rate system delivers the manifest file and corresponding content using adaptive bit rate techniques to an adaptive bit rate client device 1534.

Adaptive bit-rate streaming is a technique for streaming multimedia where the source content is encoded at multiple bit rates. Adaptive streaming, also known as adaptive bit rate (adaptive bit rate) streaming, is a delivery method for streaming video over Internet Protocol (IP). It is based on a series of short Hypertext Transfer Protocol (HTTP) downloads which is applicable to the delivery of both live and on demand content. It relies on HTTP as the transport protocol and performs the media download as a series of very small files. The content is cut into many small segments (chunks) and encoded into the desired formats. A chunk is a small file containing a short video segment (typically 2 to 10 seconds) along with associated audio and other data. Adaptive streaming uses HTTP as the transport for these video chunks.

As used herein, a chunk is a small file containing a short video segment (typically 2 to 10 seconds) along with associated audio and other data. Adaptive streaming may use the Hypertext Transfer Protocol (HTTP) as the transport protocol for these video chunks. For example, 'chunks' or 'chunk files' may be short sections of media retrieved in an HTTP request by an adaptive bit rate client. In some cases these chunks may be standalone files, or may be sections (i.e. byte ranges) of one much larger file. For simplicity the term 'chunk' is used to refer to both of these cases (many small files or fewer large files).

Adaptive bit rate techniques enable the content delivery system to detect a user's bandwidth and optionally other capabilities, such as CPU capacity, in real time and adjust the quality of a video stream accordingly. It uses an encoder which can encode a single source video at multiple bit rates. The client switches between streaming the different encodings depending on available resources. The result: very little buffering, fast start time and a good experience for both high-end and low-end connections.

The client device may request fragments of video from the server for playback at the client device. Since adaptive bit rate fragments are available on the server in one of several bit rates, the client may switch bit rates at the fragment boundaries. Thus, the client can adjust its request for the next fragment. The result is a system that can dynamically adjust to varying network congestion levels. Often, the quality of the video stream streamed to a client device is adjusted in real time based on the bandwidth and CPU of the client device. For example, the client may measure the available bandwidth and request a fragment that best matches a measured available bit rate.

As shown in FIG. 15, the live stream 1502 and stored stream 1504 may be input to a real-time encoder or an on demand just-in-time encoder, 1506, 1508, respectively. The encoder converts whole content streams in to multiple streams at different bit rates. For example, an encoder is responsible for taking an MPEG stream (e.g., MPEG-2/MPEG-4) or a stored MPEG stream (e.g., MPEG-2/MPEG-4), encoding it digitally, encapsulating it in to MPEG-2 single program transport streams (SPTS) multiple bit rates formats, and preparing the encapsulated media for distribution. The live stream 1502 may be encoded into three transport streams, 1510, 1512, 1514, each having a different bit rate. The live stream 1502 may be a broadcast of multimedia content from a content provider. The stored stream 1504 is transcoded in to three transport streams, 1516, 1518, and 1520, each having a different bit rate. The stored stream may be on demand content, for example.

The resultant transport streams 1510, 1512, 1514, 1516, 1518, and 1520 are passed through a fragmenter 1522. The fragmenter 1522 reads each encoded stream 1510, 1512, 1514, 1516, 1518, and 1520 and divides them in to a series of fragments of a finite duration. For example, MPEG streams may be divided into a series of 2-3 second fragments with multiple wrappers for the various adaptive streaming formats (e.g., Microsoft Smooth Streaming, APPLE HLS).

As shown in FIG. 15, the transport streams 1510, 1512, 1514, are fragmented by fragmenter 1522 into adaptive bit rate media segments 1524*a-e*, 1526*a-e*, and 1528*a-e*, respectively. The resultant transport streams 1516, 1518, and 1520, are fragmented by fragmenter 1522 into adaptive bit rate media segments 1530*a-e*, 1532*a-e*, and 1534*a-e*, respectively. The fragmenter 1522 is also referred to herein as a packager, as the packager can include fragmenting the content into fragments and then encrypting each fragment using a content key.

The packager 1500 can generate a manifest file that represents a playlist. The playlist can be a manifest file that lists the locations of the fragments of the multimedia content. By way of a non-limiting example, the manifest file can comprise a uniform resource locator (URL) for each fragment of the multimedia content. If encrypted, the manifest file can also comprise the content key used to encrypt the fragments of the multimedia content The packager may facilitate adaptive bit rate streaming of video and audio to multi-screen video (MSV) clients. The packager may be a software element residing on a multirate transcoder. The packager may co-exist with a HTTP server, a streaming Edge Server, or may be a standalone appliance. Further the packager may optionally have a built-in content delivery network interface or an HTTP server interface such that it can support clients directly. Direct support of clients may be limited to VoD and nDVR type applications.

The discrete segments may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring.

As described herein, the types of content that the packager may package includes Live Linear, VOD, StartOver, and nDVR. VOD content and nDVR content were described above. Live content are television programs that are watched in real time. This means that packaging must be an ongoing process that occurs simultaneously with playback. StartOver contents are live content whose viewing can be started after the content start time. You can for example at 15:15 PM start watching a 15:00 PM live program.

Per service the packager will be configured to perform segmentation/chunking for either all output adaptive bit rate formats or a subset of the output adaptive bit rate streaming formats. The packager will also create the respective manifest files. The chunk durations may be different for each adaptive bit rate format, but they will all have to be an integer multiple of the GOP size or key frame intervals. However for a given adaptive bit rate format the chunk durations will be the same for all streams in an output stream group.

The packager may be a logical software service which can run on various hardware platforms, located at various points in the network. In general it either lives "in the center" or "at the edge". In a center deployment it may be logically positioned between the Transcoder and the origin server. In an edge deployment it is logically positioned between the origin server and the Edge Server.

The packager shall further support ad-insertion, blackout/content substitution, and EAS via playlist manipulation. The actual playlist manipulation may or may not be performed by the packager.

In centralized packaging the transcoder and packager may be co-located. The transcoder may directly feeds multi-bitrate streams into the packager. The packager performs its packaging function and publishes the adaptive bit rate streams to one or more servers downstream from it. In both instances of remote packaging the packager is separated from the transcoder by some type of an IP network. In the distributed packaging instance the transcoder and packager may be separated by a multicast routable IP network. In such a network the transcoder outputs multicast SPTSs that are routed directly to one or more distributed packagers. The packagers ingest these multicast transport streams perform the packaging function and publish adaptive bit rate streams to servers downstream from them. In the final case of edge packaging the transcoder and packager are separated by a content delivery network. The transcoder publishes content to the origin server of a content delivery network between the transcoder and packager. The packager uses HTTP methods to retrieve this transcoded content from the origin server. After packaging the adaptive bit rate streams are published to downstream servers for being streamed to clients upon request. Downstream from the packagers and the servers to which they publish adaptive bit rate streams, clients are typically served by MSO's DOCSIS based access networks or Telco's DSL or PON based access networks. The packager will be capable of supporting live linear content, Video on Demand (VoD), and network Digital Video Recorder (nDVR) content.

After fragmentation, the fragments and manifest files (list of assets fragment) are placed on a content delivery network server. The content delivery network logic stores the fragments according to an internal heuristic logic algorithm, determining whether and where to store the content. For example, more popular content may be stored in local storage to decrease network bandwidth usage and increase access speed. Less popular content may be stored in a central repository to reduce costs for fast storage. For example, content that may be stored includes on demand and network DVR content. Live non-DVR content fragments may be distributed by the content delivery network but not stored.

HTTP is a manner for retrieving files from the Internet and the technology is built into web browsers. HTTP has more recently become a preferred method to deliver video. It can be used to deliver video in an adaptive streaming manner in which the video is encoded into various bit rates and fragmented for delivery. Business rules, such as network congestion or processor utilization, are used to determine which bit rate is delivered at what time.

The disclosed packager supports adaptive bit rate streaming in any container formats. Examples of these adaptive bit rate video container formats include HTTP Live Streaming (Apple—HLS), Internet Information Services—Smooth Streaming (Microsoft—HSS), and HTTP Dynamic Streaming (Adobe—HDS). The container formats have become de-facto industry standards due to their widespread use. The disclosed packager also supports profiles from the MPEG-DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes.

An illustrative adaptive streaming system 100 may implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The packager converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and 30 minute program the packager will create three HSS files but 2700 HLS files. The packager can create multiple formats simultaneously. Each format to be generated is specified by a profile.

Apple HLS breaks the whole content stream in to a sequence of small HTTP based file downloads. As the stream is played, the client selects from a number of different bit rate streams based on the client CPU and bandwidth.

Microsoft HSS is a media services extension to enable adaptive streaming of media to clients over HTTP, using a concept of delivering small content fragments (e.g., 2 seconds video) and verifying that each has arrived within appropriate time and playback at the expected quality level.

Overall quality with adaptive bit rate may be the best possible for a given user's network connection, thereby maximizing the quality of experience.

To conserve network bandwidth, video file fragments can be multicast. With multicast, a single source sends data to multiple destinations at one time. Each TV channel has its own multicast. A multicast will only be joined when requested from a subscriber. Multicast makes the routers replicate fragments only when necessary (see FIG. 15). If the multicast is not already joined in a service group, then the first join from any subscriber in that service group starts it, similar to how SDV works. IP VOD delivery, though, is unicast but can the leverage the multiple bit-rate encodings to provide adaptive streaming. With this approach, the bit rate can change dynamically providing a method to manage network bandwidth. This removes the need for more formal Quality of Service (QoS) and session management solutions. Priority can be given to transactional requests to offer the highest quality video. This is a much simpler method of QoS and session management than conventional methods such as PCMM In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. An adaptive transcoder for synchronizing multiple stream representations in an output group, the transcoder comprising:
    at least one input for receiving an input stream;
    a plurality of encoders for outputting stream representations associated with the same input stream, wherein at least one of the plurality of encoders is designated as a master encoder based on an output frame rate and resolution of stream representations output from the plurality of encoders, the output group comprising of at least one of: a plurality of stream representations generated from a single stream input to said transcoder, or a plurality of stream representations generated from corresponding input streams input to a plurality of transcoders including said transcoder,
    wherein one or more of the remaining encoders associated with the output group are designated as slave encoders;
    the master encoder determining where to fragment a received stream;
    the master encoder identifying fragment boundary points for synchronizing stream representations in the output group with a master encoder output representation stream; and
    the master encoder providing the identified fragment boundary points and corresponding time stamps to each slave encoder associated with the output group for generating a slave encoder output stream representation that is synchronized with the master encoder output stream representation.

2. The transcoder of claim 1, wherein in response to the fragment boundary point information received from the master encoder, the slave encoders fragment each slave encoder stream representation using the received fragment boundary points and the time stamps.

3. The transcoder of claim 1, the master encoder further providing results of an inverse telecine determination, determined internal to the transcoding processor hosting the master encoder, to each slave encoder associated with the output group.

4. The transcoder of claim 3, wherein in response to results of the inverse telecine determination received from the master encoder, each slave encoder chooses the same repeat fields for performing inverse telecine at each respective slave encoder as chosen by the master encoder.

5. The transcoder of claim 4, wherein the master encoder providing results of an inverse telecine determination comprises providing frame statistics to the slave encoders for processing by each slave encoder of the same 24p image statistics.

6. The transcoder of claim 1, the master encoder further providing a selection of one or more frames for frame rate conversion, determined internal to the transcoding processor hosting the master encoder, to each slave encoder associated with the output group.

7. The transcoder of claim 6, wherein in response to the selection of the one or more frame rates for frame rate conversion by the master encoder, the slave encoders choose the same frames for frame rate conversion for each respective slave encoder output stream representation.

8. The transcoder of claim 6, the conversion comprising master encoder converting at least one of:
from 30 frames per second interlaced content (i.e., 30i) to 30 frames per second progressive output by extracting only a top field from the 30i content,
from 25i (i.e., 50i) to 25p by extracting only a top field from the 25i content,
from 60 frames per second interlaced content (i.e., 60p) to 30 frames per second progressive output by using a frame in which a difference in PTS from a previous frame's PTS is 1501 ticks of a clock, or
from 50p to 25p by initiating a selection of one 50p frame and then selecting every other subsequent 50p frame for the 25p output.

9. The transcoder of claim 8, wherein the master encoder provides the manner of frame rate conversion to the slave encoders for extraction by the slave encoders of a same image during conversion from 30i to 30p.

10. The transcoder of claim 8, wherein the master encoder signals to the slave encoders which frames were selected for use by the slave encoders or for the slave encoders to skip a 50p frame to select the corresponding frame selected by the master encoder.

11. The transcoder of claim 6, wherein the master encoder determines a frame in the master encoder output representation stream in which a scene change is located that will be skipped when converting the output frame rate of the stream from a first output frame rate to a second output frame rate, said second output frame rate causing an increase in a number of frames in the output stream representation to achieve the first output frame rate, sets a PTS at a fragment boundary on the output stream representation at the first output frame rate to match a PTS at a fragment boundary of the output stream representation at the second output frame rate, and signals a single frame instead of the increased number of frames on a previous frame.

12. The transcoder of claim 11, wherein the second output rate causes the output stream representation to be frame doubled or frame tripled to achieve the first output frame rate, wherein the single frame on the previous frame is signaled instead of signaling frame doubling or frame tripling, respectively.

13. The transcoder of claim 11, wherein the first output rate is 30p and the second output rate is 60p.

14. The transcoder of claim 6, wherein the master encoder determines a frame in a stream in which a scene change is located that is skipped when converting the output frame rate of the stream from a first output rate to a second output rate, and moves a PTS on the stream at the second output frame rate to match an instantaneous decode refresh (IDR) on the stream at the first output frame rate.

15. The transcoder of claim 1, wherein the transcoder determines for each fragment identified whether the fragment is a complete segment.

16. The transcoder of claim 15, wherein if a segment picture count (SegmentPicCnt) added to a maximum fragment size (MaxFragment Size) is greater than a segment size (SegmentSize), then the fragment is a segment, else if the segment picture count (SegmentPicCnt) is a number of frames since a last segment boundary, a MaxFragmentSize is set as a longest fragment size defined by a user and a SegmentSize is set as a longest SegmentSize defined by the user.

17. The transcoder of claim 16, wherein when a group of pictures (GOP) selection code sets a current frame as an instantaneous decode refresh (IDR), the current frame is reset as a fragment boundary so a next frame is not forced as the instantaneous decode refresh (IDR).

18. The transcoder of claim 1, wherein the input to each of the plurality of encoders has an input resolution and frame rate of the single input stream input to the transcoder, and the stream representations output from the plurality of encoders in the output group vary from each other by both resolution and frame rate but maintain identical segment boundaries between the stream representations.

19. The transcoder of claim 1, wherein the master encoder is selected as the encoder in the plurality of encoders that produces a stream representation with a highest resolution in the output group.

* * * * *